US012573609B2

(12) United States Patent
Kim et al.

(10) Patent No.: US 12,573,609 B2
(45) Date of Patent: Mar. 10, 2026

(54) LITHIUM METAL ANODE, FABRICATION METHOD THEREOF, AND LITHIUM SECONDARY BATTERY COMPRISING SAME ANODE

(71) Applicants: POSCO CO., LTD, Pohang-si (KR); RESEARCH INSTITUTE OF INDUSTRIAL SCIENCE & TECHNOLOGY, Pohang-si (KR)

(72) Inventors: Jin Hong Kim, Pohang-si (KR); Hong-Youl Bae, Pohang-si (KR); Mun Kyu Cho, Pohang-si (KR); Nam Soon Choi, Ulsan (KR); Sang-Lag Lee, Pohang-si (KR); Weon-Soo Bae, Pohang-si (KR); Yong Won Lee, Ulsan (KR); Ji-Woong Moon, Pohang-si (KR)

(73) Assignees: POSCO Holdings Inc., Seoul (KR); Research Institute of Industrial Science & Technology, Pohang-si (KR)

( * ) Notice: Subject to any disclaimer, the term of this patent is extended or adjusted under 35 U.S.C. 154(b) by 0 days.

(21) Appl. No.: 18/662,557

(22) Filed: May 13, 2024

(65) Prior Publication Data

US 2024/0363832 A1 Oct. 31, 2024

Related U.S. Application Data

(63) Continuation of application No. 16/473,087, filed as application No. PCT/KR2017/014870 on Dec. 15, 2017, now abandoned.

(30) Foreign Application Priority Data

Dec. 23, 2016 (KR) ........................ 10-2016-0178149
Oct. 31, 2017 (KR) ........................ 10-2017-0143551

(51) Int. Cl.
*H01M 4/134* (2010.01)
*H01M 4/02* (2006.01)
(Continued)

(52) U.S. Cl.
CPC ......... *H01M 4/134* (2013.01); *H01M 4/0423* (2013.01); *H01M 4/1395* (2013.01);
(Continued)

(58) Field of Classification Search
CPC .. H01M 4/0423; H01M 4/134; H01M 4/1395; H01M 4/667; H01M 10/0525; H01M 2004/021
See application file for complete search history.

(56) References Cited

U.S. PATENT DOCUMENTS 6,517,590 B1 2/2003 Gauthier et al.
6,713,216 B2 3/2004 Kugai et al.
(Continued)

FOREIGN PATENT DOCUMENTS

CN 1389940 A 1/2003
CN 1624954 A 6/2005
(Continued)

OTHER PUBLICATIONS

KR20160052323A English machine translation (Year: 2024).*
(Continued)

*Primary Examiner* — Armindo Carvalho, Jr.
(74) *Attorney, Agent, or Firm* — Morgan Lewis & Bockius LLP

(57) ABSTRACT

One embodiment of the present invention relates to a lithium metal anode. Wherein the lithium metal anode comprises a current collector and a lithium metal thin film layer disposed on at least one surface of the current collector and having a thickness in a range of 0.1 to 200 μm and a coating layer disposed on a surface of the lithium metal thin film layer,
(Continued)

10 wherein, the coating layer comprising a Li—N—C—H—O based ionic compound.

9 Claims, 26 Drawing Sheets

(51) Int. Cl.

| | |
|---|---|
| ***H01M 4/04*** | (2006.01) |
| ***H01M 4/1395*** | (2010.01) |
| ***H01M 4/66*** | (2006.01) |
| ***H01M 10/0525*** | (2010.01) |

(52) U.S. Cl.

CPC ....... *H01M 4/667* (2013.01); *H01M 10/0525* (2013.01); *H01M 2004/021* (2013.01)

(56) References Cited

U.S. PATENT DOCUMENTS

| | | | |
|---|---|---|---|
| 2002/0182488 | A1 | 12/2002 | Cho et al. |
| 2004/0209159 | A1 | 10/2004 | Lee et al. |
| 2005/0042515 | A1 | 2/2005 | Hwang et al. |
| 2011/0283934 | A1 | 11/2011 | Jadins et al. |
| 2012/0276459 | A1 | 11/2012 | Im et al. |
| 2014/0004418 | A1 | 1/2014 | Kobayashi |
| 2014/0127419 | A1 | 5/2014 | Fleischmann et al. |
| 2014/0170478 | A1 | 6/2014 | Liao et al. |
| 2015/0180037 | A1 | 6/2015 | Gronwald et al. |
| 2016/0013462 | A1 | 1/2016 | Cui et al. |
| 2016/0087311 | A1 | 3/2016 | Doelle et al. |
| 2016/0141598 | A1 | 5/2016 | Dai et al. |
| 2016/0329567 | A1 | 11/2016 | Lee et al. |
| 2016/0372743 | A1 | 12/2016 | Cho et al. |
| 2018/0198120 | A1 | 7/2018 | Kubota |

FOREIGN PATENT DOCUMENTS

| | | | |
|---|---|---|---|
| CN | 102760860 | A | 10/2012 |
| CN | 103430359 | A | 12/2013 |
| CN | 105591071 | A | 5/2016 |
| CN | 105609700 | A | 5/2016 |
| JP | 2002-504741 | A | 2/2002 |
| JP | 2003-036842 | A | 2/2003 |
| JP | 2007-165061 | A | 6/2007 |
| JP | 2013-62047 | A | 4/2013 |
| JP | 2015-537346 | A | 12/2015 |
| JP | 2016-503944 | A | 2/2016 |
| KR | 10-0413796 | B1 | 1/2004 |
| KR | 10-2009-0091659 | A | 8/2009 |
| KR | 10-1156225 | B1 | 6/2012 |
| KR | 10-1350361 | B1 | 1/2014 |
| KR | 10-1503571 | B1 | 3/2015 |
| KR | 10-2016-0052323 | A | 5/2016 |
| KR | 10-1621410 | B1 | 5/2016 |
| KR | 10-1908645 | B1 | 10/2018 |
| WO | 2018/103563 | A1 | 6/2018 |
| WO | 2018/160209 | A1 | 9/2018 |

OTHER PUBLICATIONS

KR100413796B1 English machine translation (Year: 2024).*

U.S. Final Office Action dated May 18, 2023 issued in U.S. Appl. No. 16/473,087.

U.S. Office Action dated Jan. 25, 2023 issued in U.S. Appl. No. 16/473,087.

U.S. Office Action dated Jul. 27, 2022 issued in U.S. Appl. No. 16/473,087.

U.S. Final Office Action dated Mar. 11, 2022 issued in U.S. Appl. No. 16/473,087.

Chinese Office Action dated Jan. 26, 2022 issued in Chinese Patent Application No. 201780080191.9.

Office Action dated Nov. 23, 2021 issued in U.S. Appl. No. 16/473,087.

U.S. Final Office Action dated Aug. 10, 2021 issued in U.S. Appl. No. 16/473,087.

U.S. Office Action dated Mar. 30, 2021 issued in U.S. Appl. No. 16/473,087.

KR20160052323A—English machine translation (Year: 2021).

KR100413796B1—English machine translation (Year: 2021).

Korean Notice of Allowance dated Aug. 28, 2019 issued in Korean Patent Application No. 10-2017-0143551.

Partial Supplementary European Search Report dated Oct. 21, 2019 issued in European Patent Application No. 17884835.4.

KR-100413796-B1—English Machine Translation (Year: 2020).

Japanese Office Action dated Jul. 28, 2020 issued in Japanese Patent Application No. 2019-533086.

* cited by examiner

【Fig. 1】
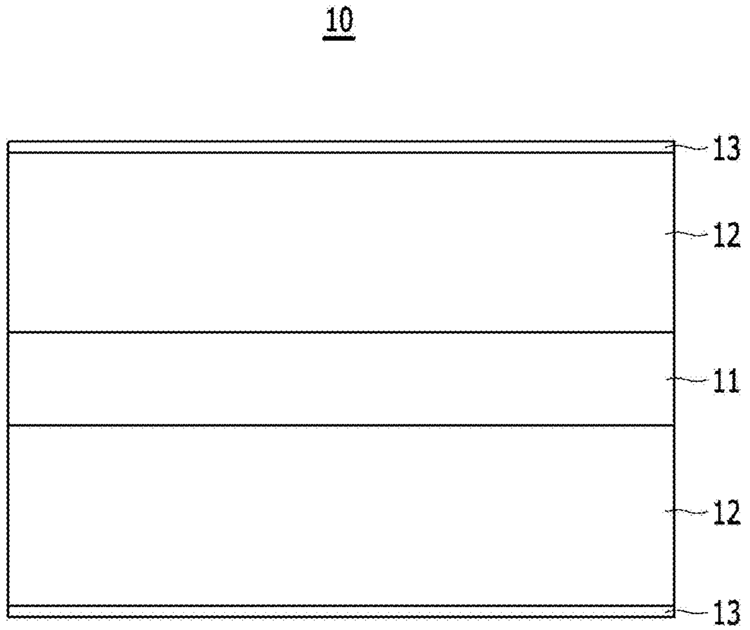
【Fig. 2】
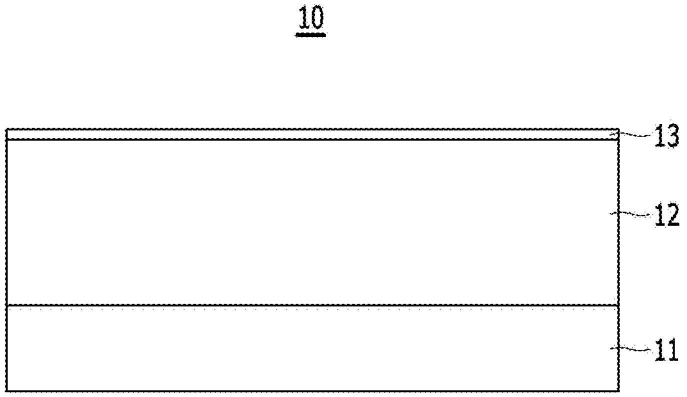

【Fig. 3】
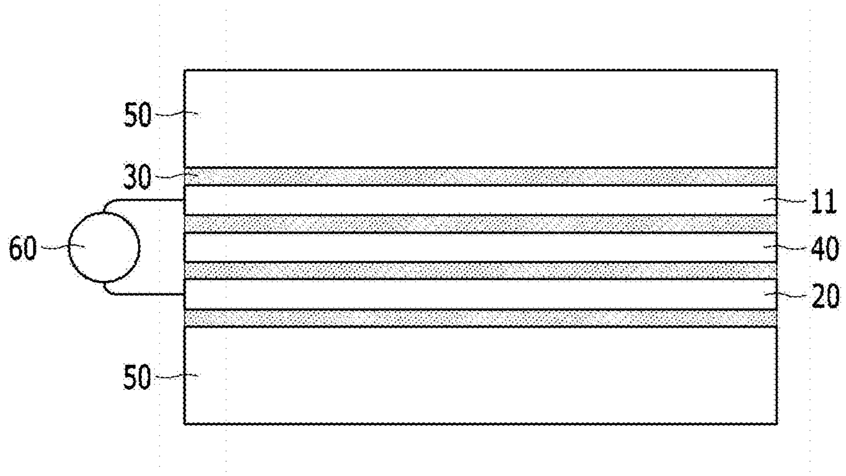
【Fig. 4】
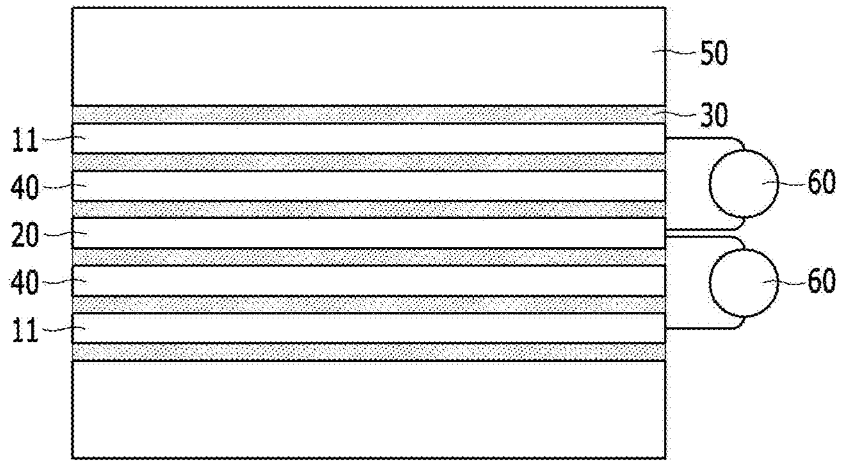

【Fig. 5】
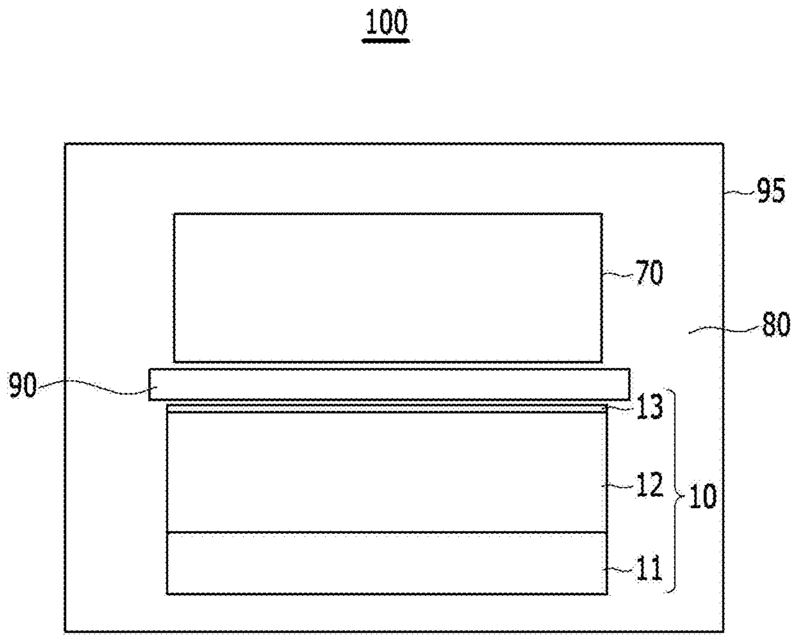
【Fig. 6a】
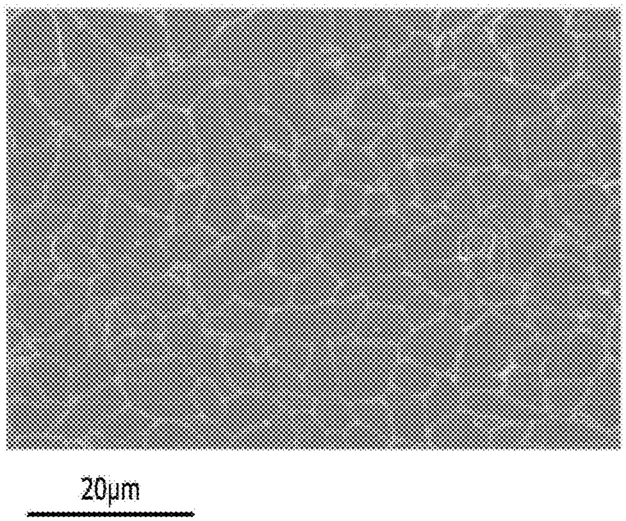

【Fig. 6b】
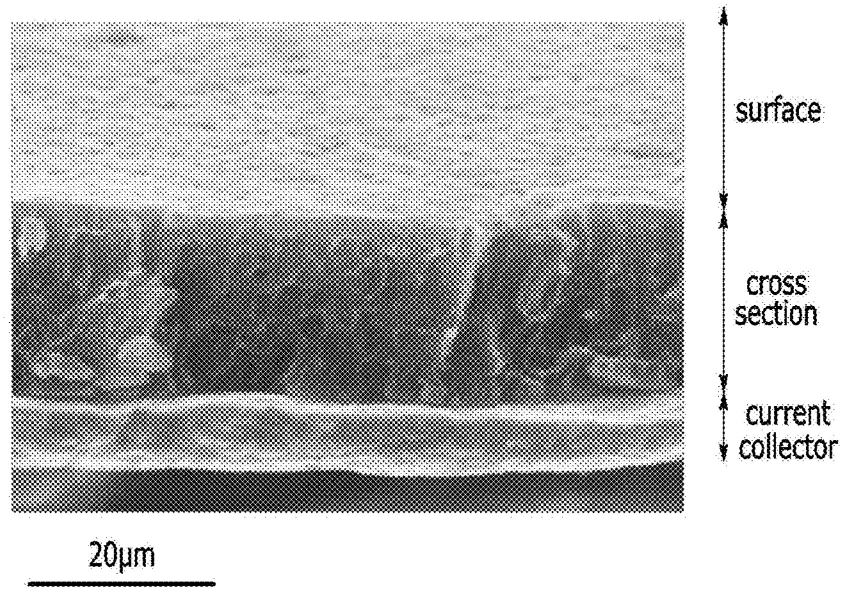
【Fig. 7a】
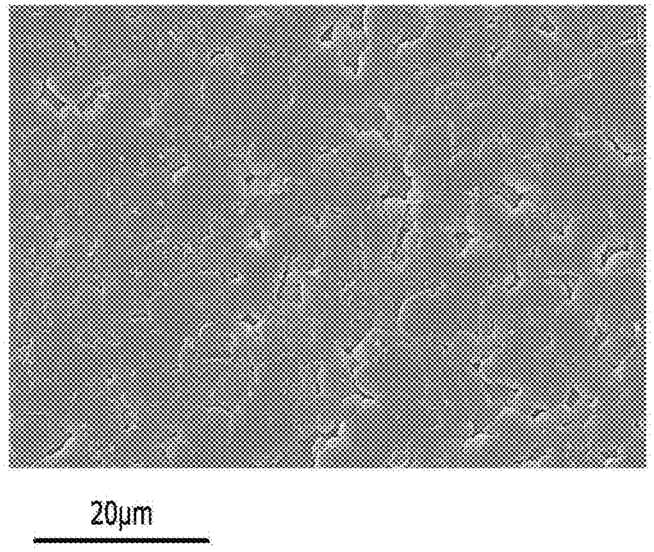

【Fig. 7b】
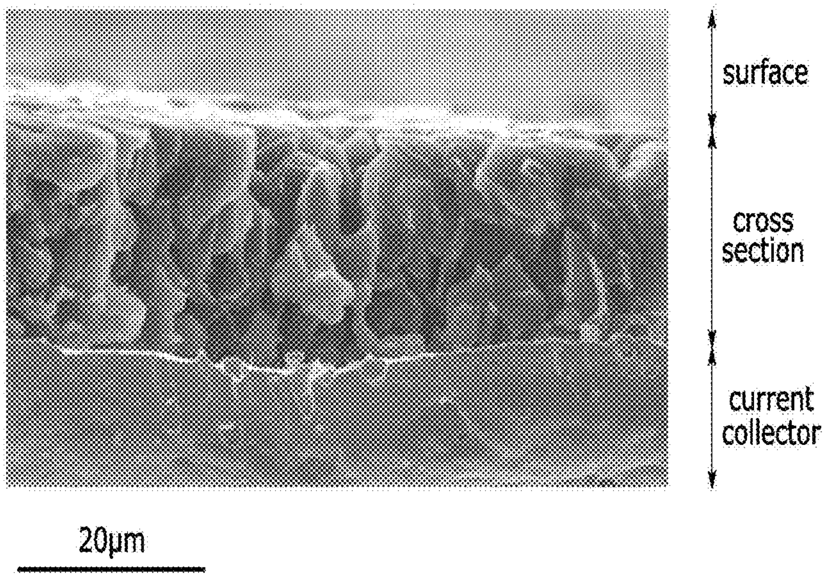
【Fig. 8a】
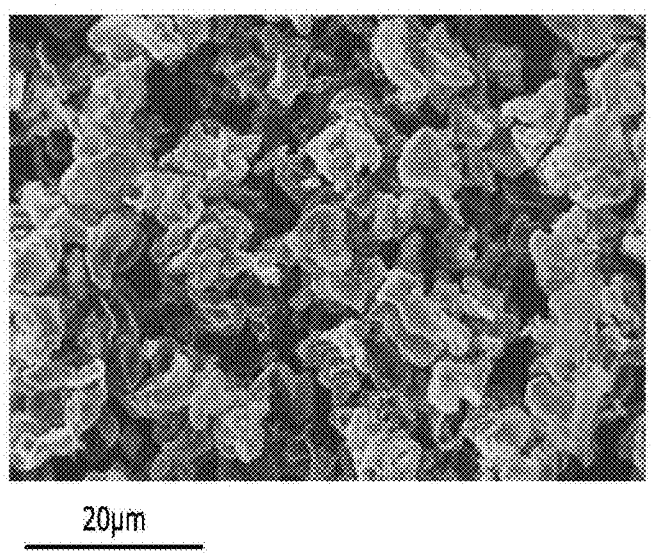

【Fig. 8b】
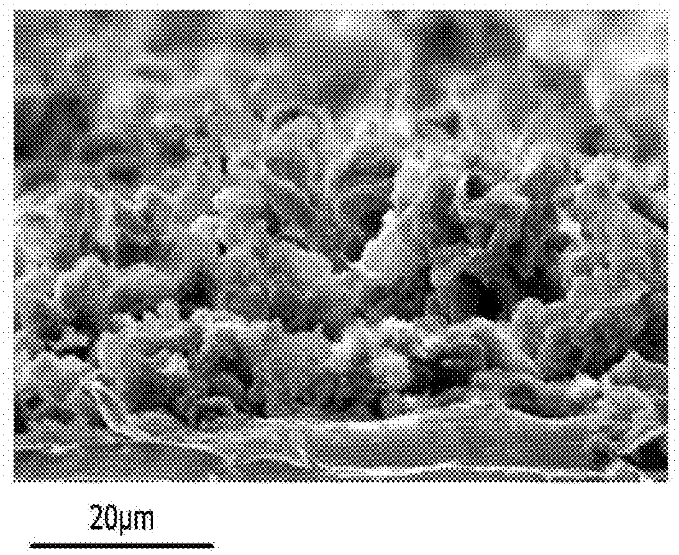
【Fig. 9a】
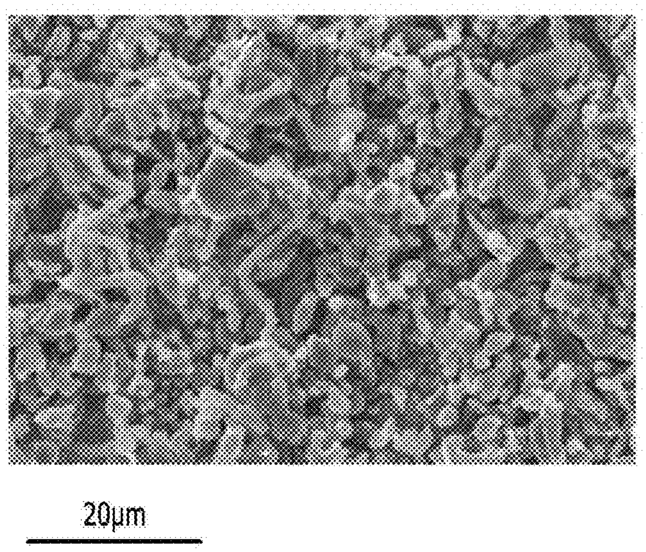

【Fig. 9b】
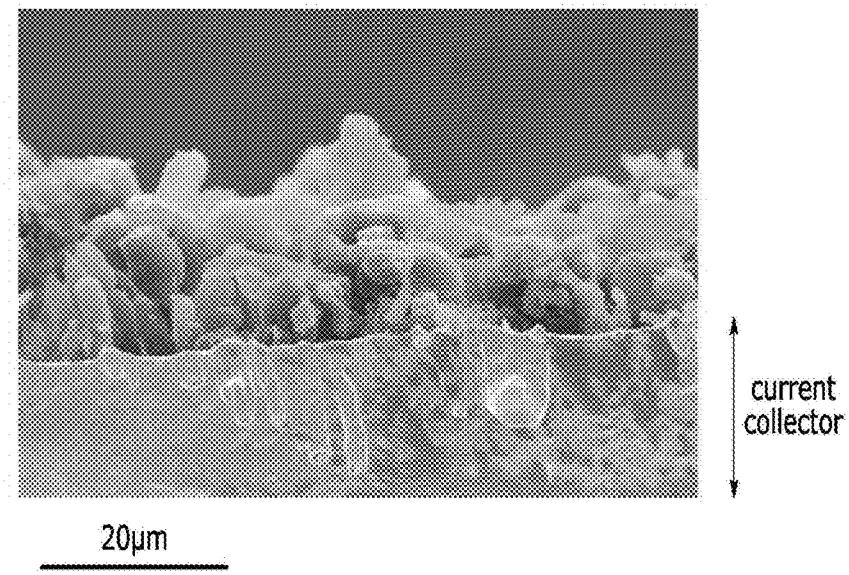
【Fig. 10a】
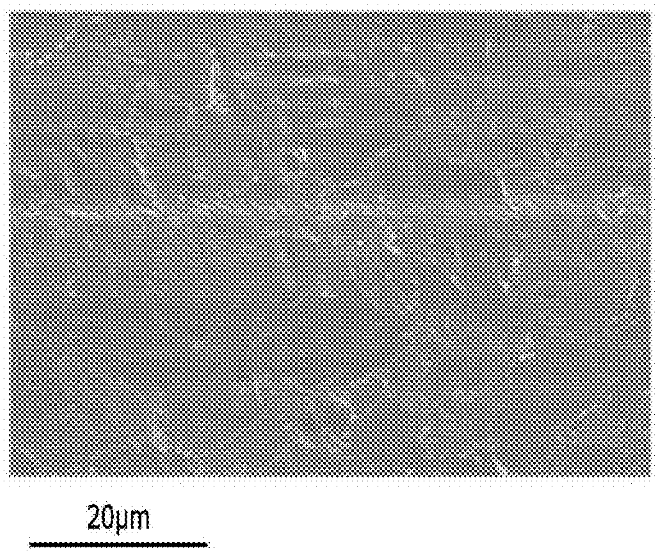

【Fig. 10b】
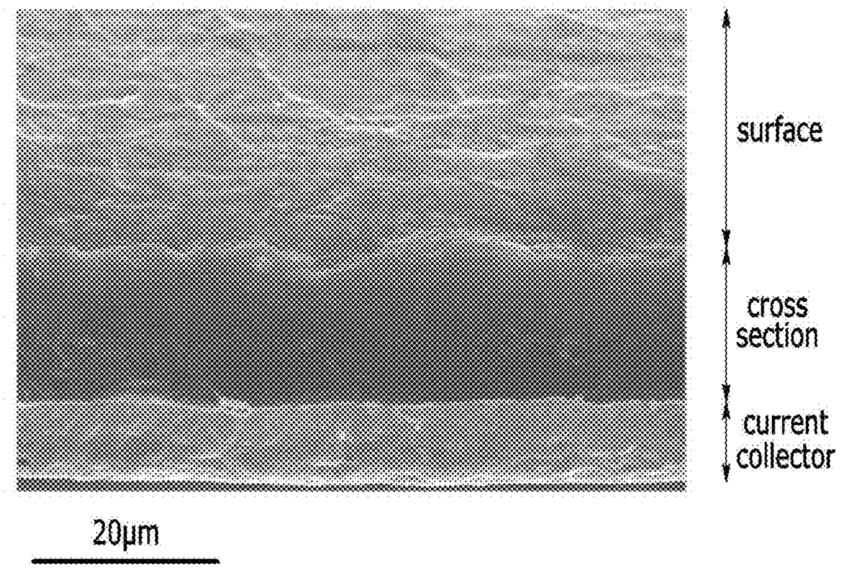
【Fig. 11a】
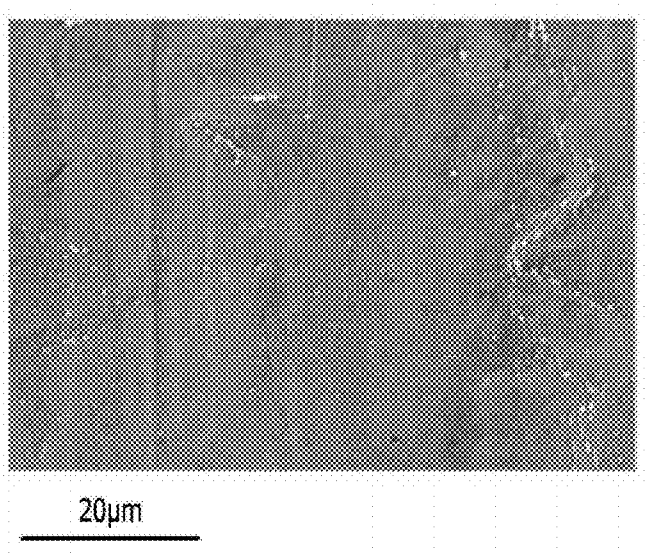

【Fig. 11b】
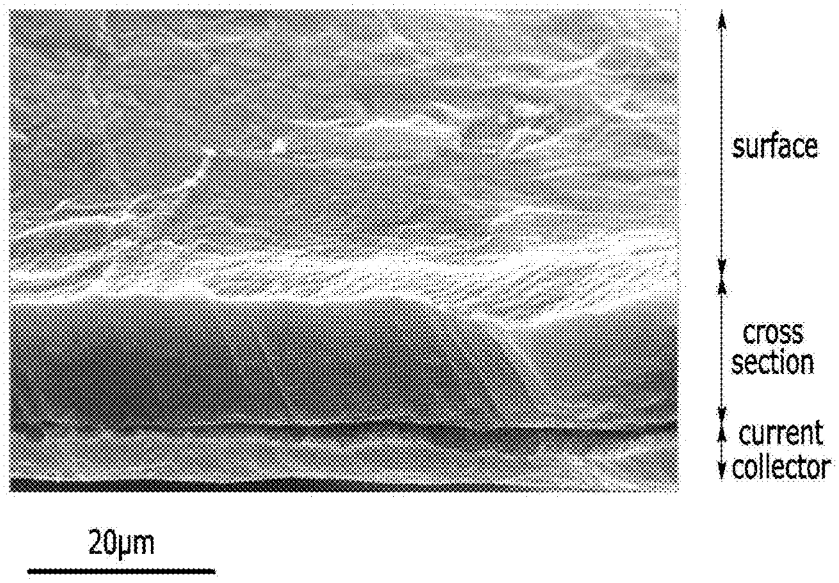

【Fig. 12a】
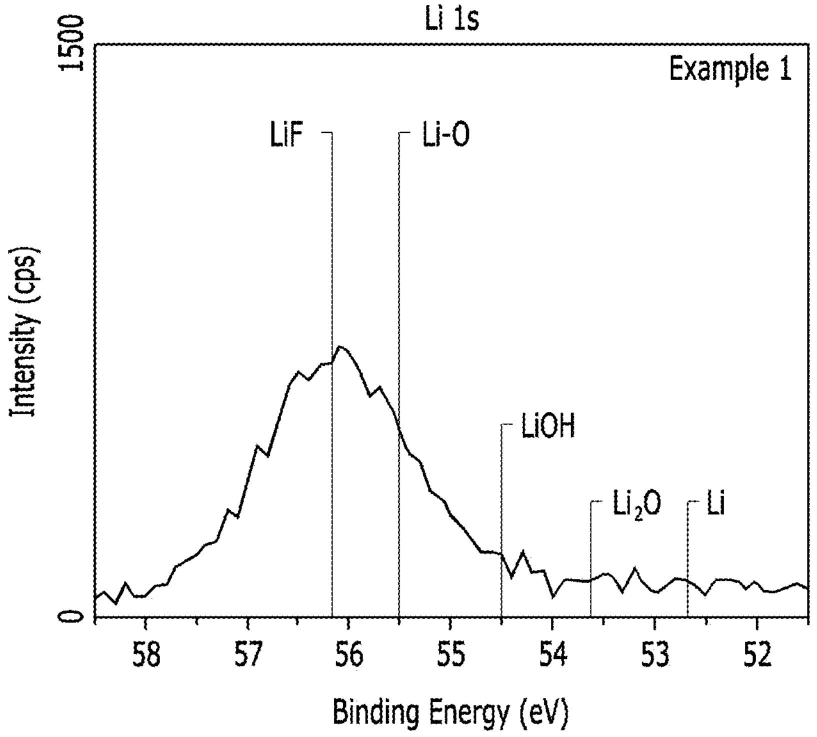

【Fig. 12b】
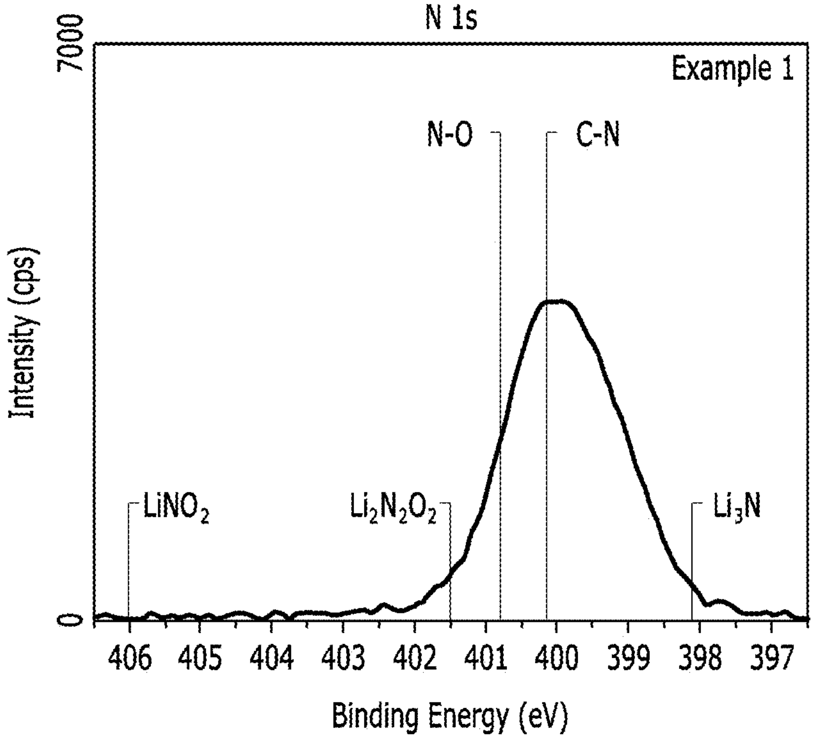

【Fig. 12c】
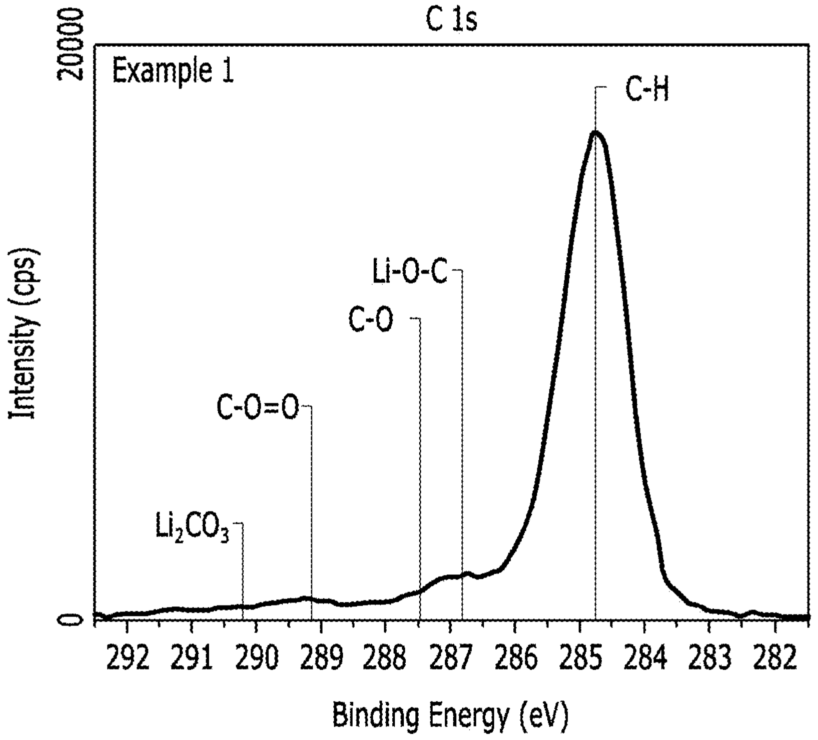

【Fig. 12d】
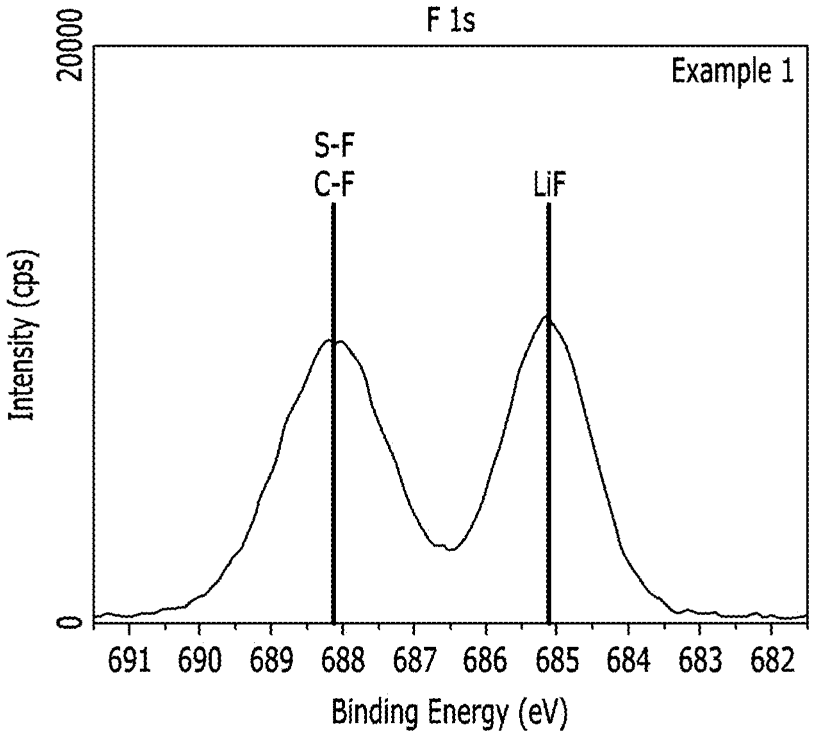

【Fig. 13a】
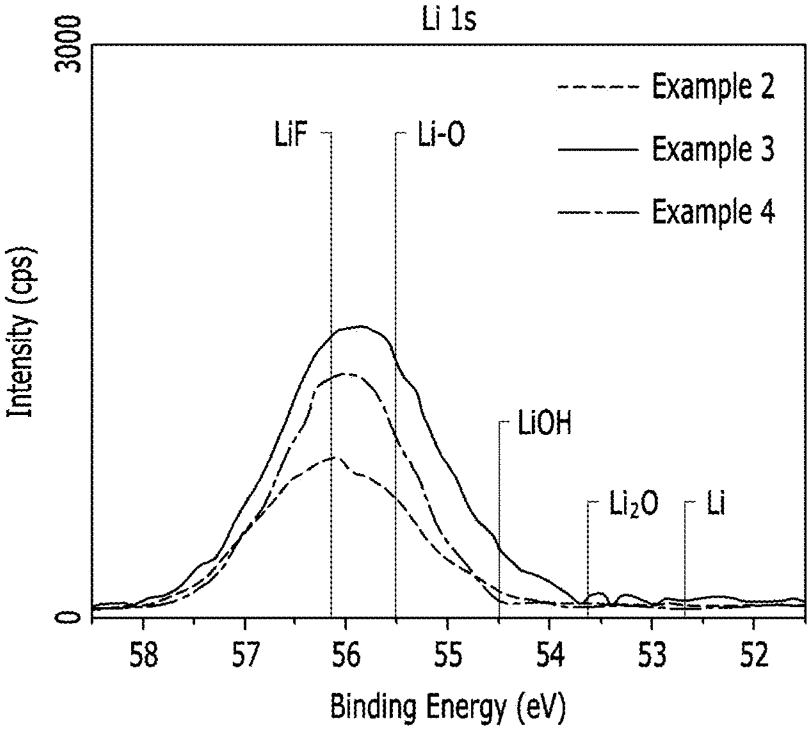

【Fig. 13b】
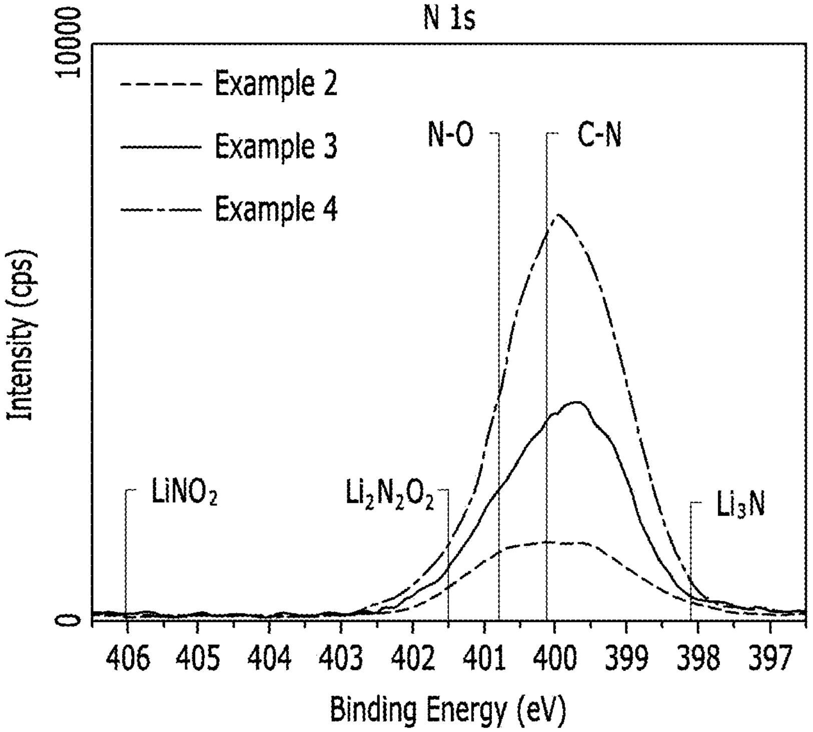

【Fig. 13c】
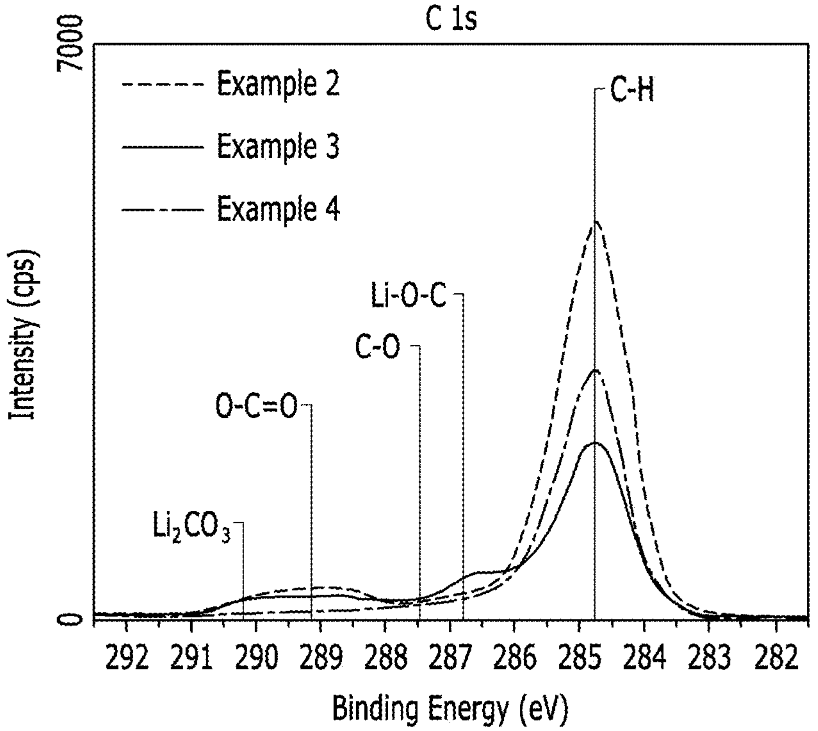

【Fig. 13d】
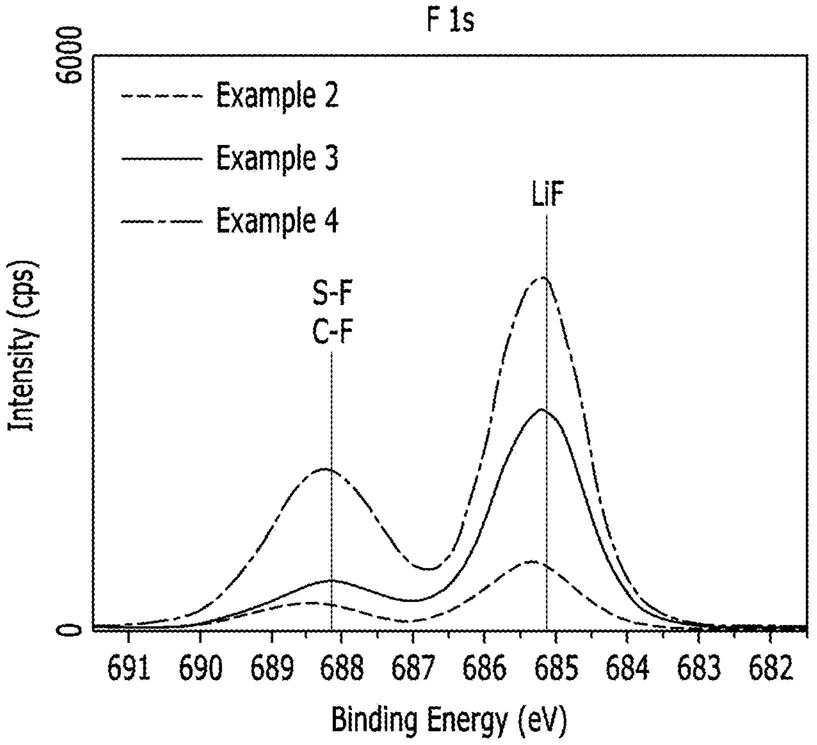

【Fig. 14a】
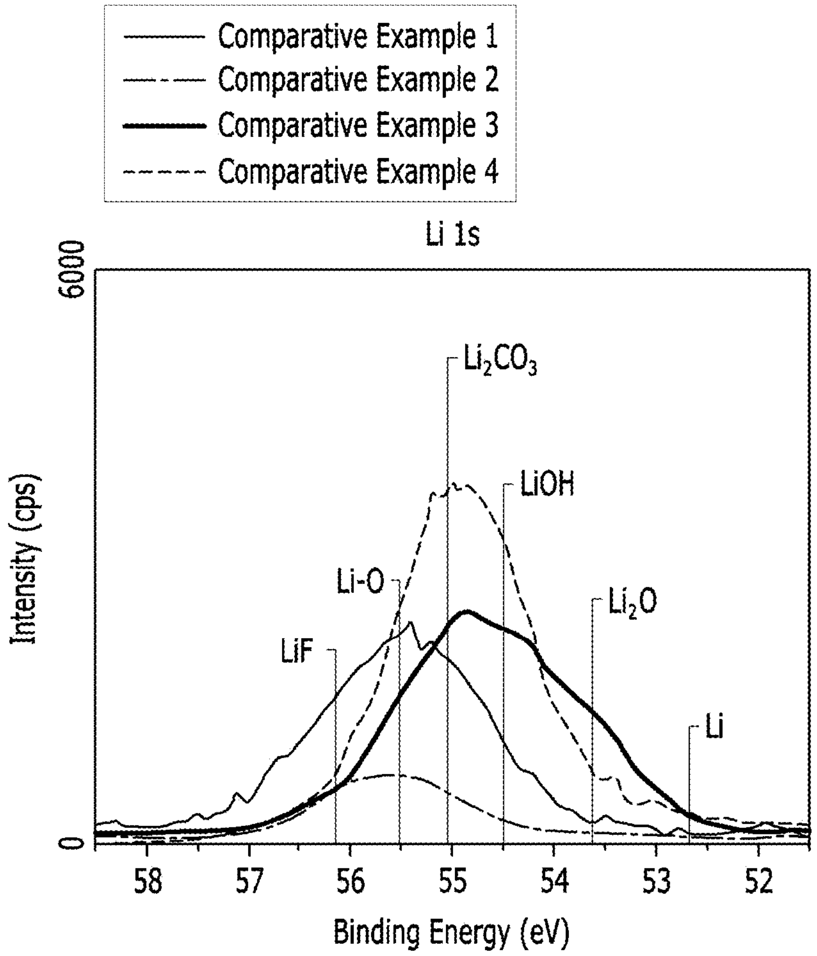

【Fig. 14b】
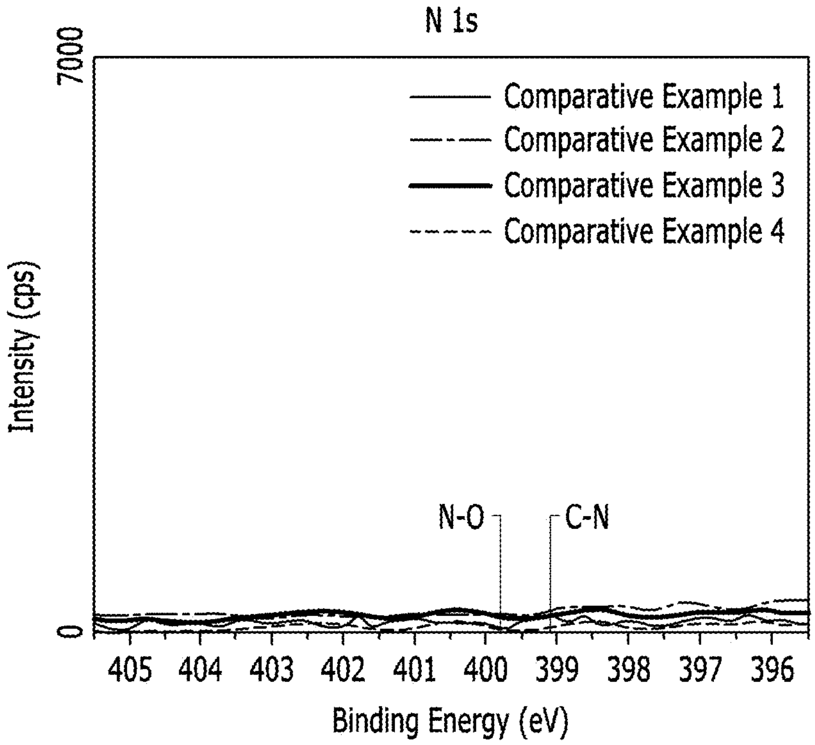

【Fig. 14c】
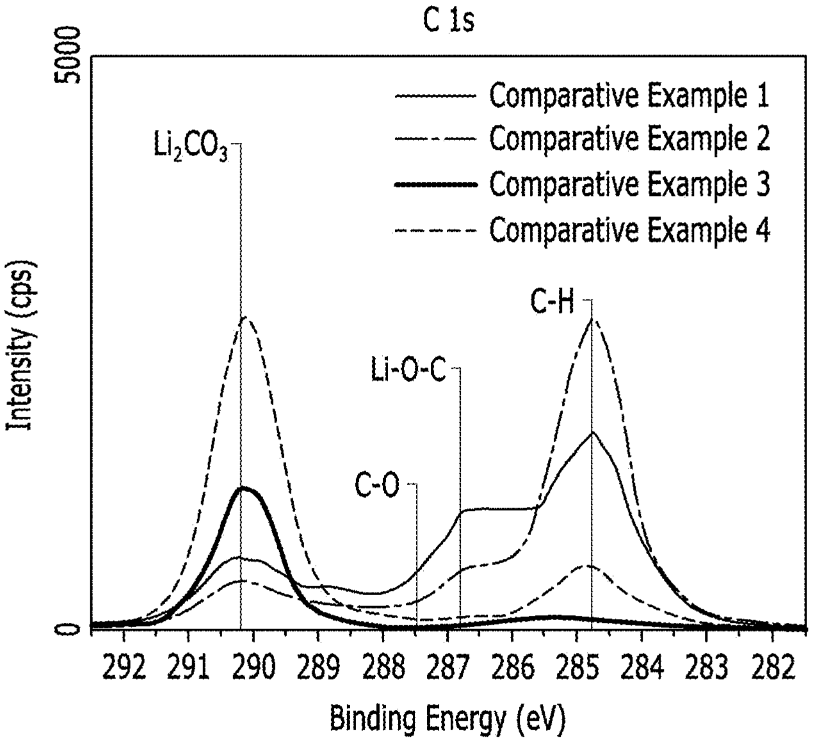

【Fig. 14d】
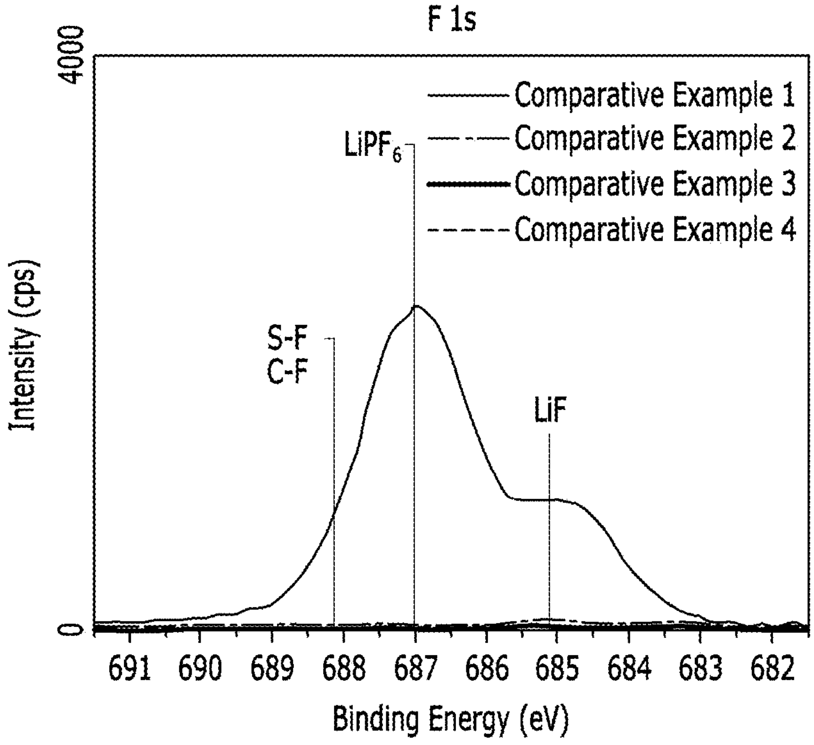

【Fig. 15a】
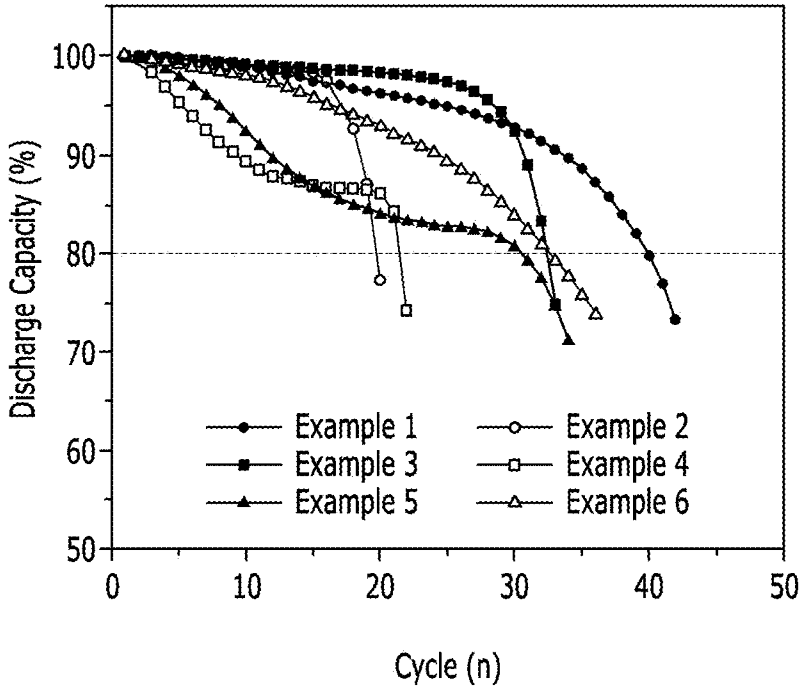

【Fig. 15b】
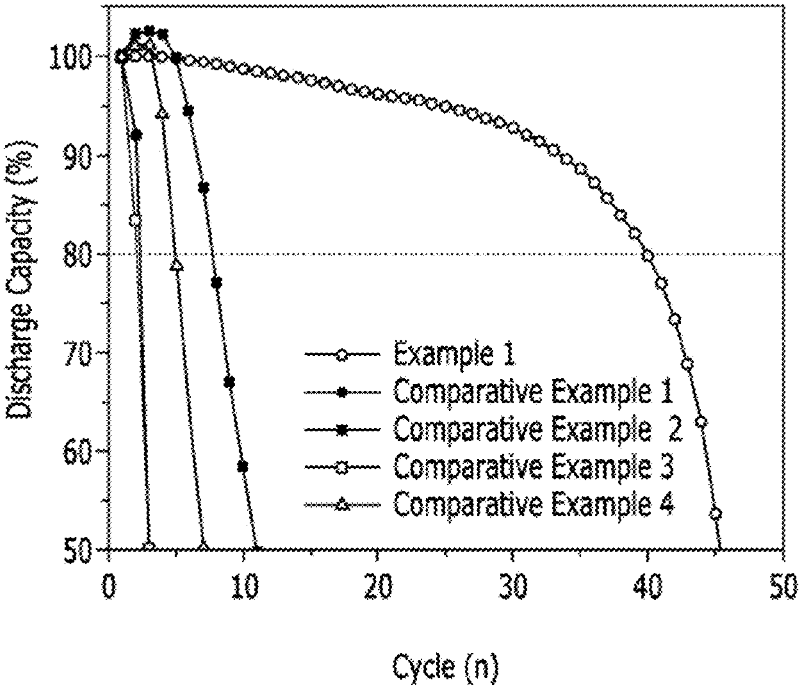
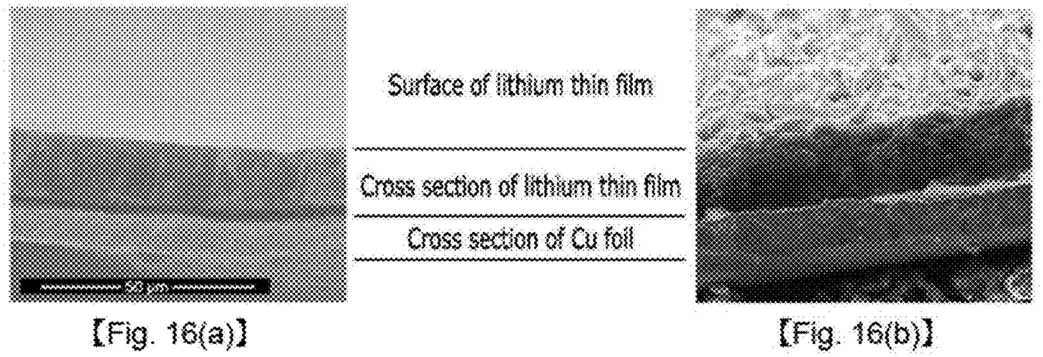
【Fig. 16(a)】 【Fig. 16(b)】

【Fig. 17】
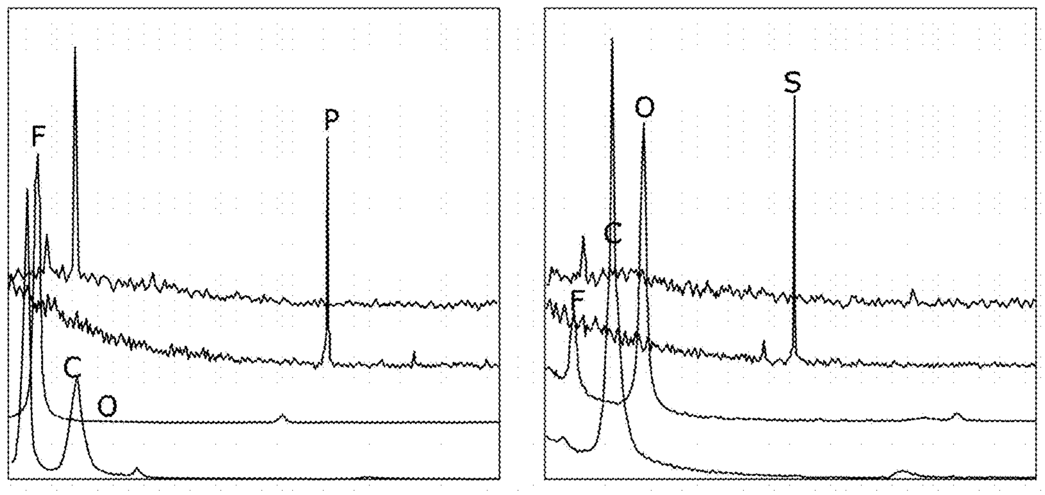
【Fig. 18】
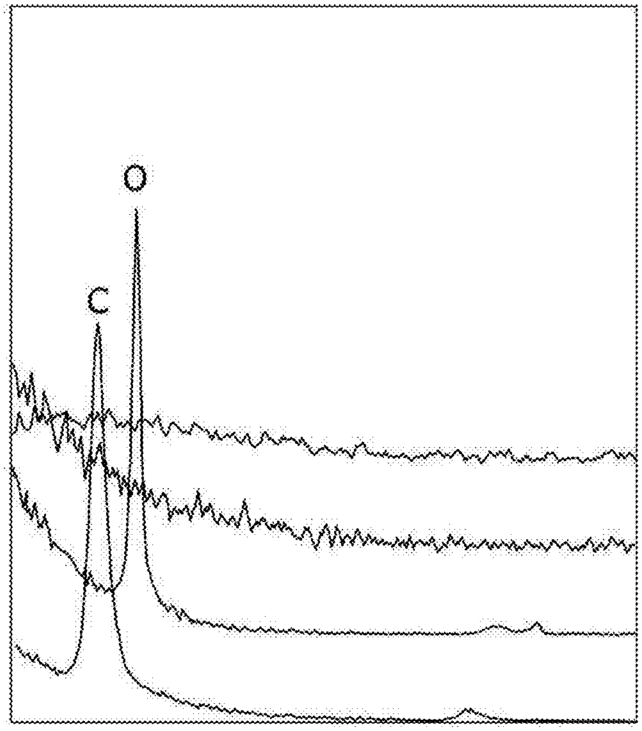

【Fig. 19】
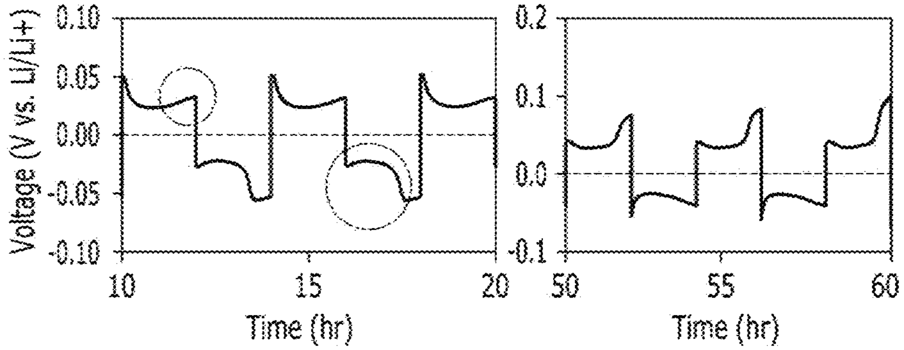
【Fig. 20】
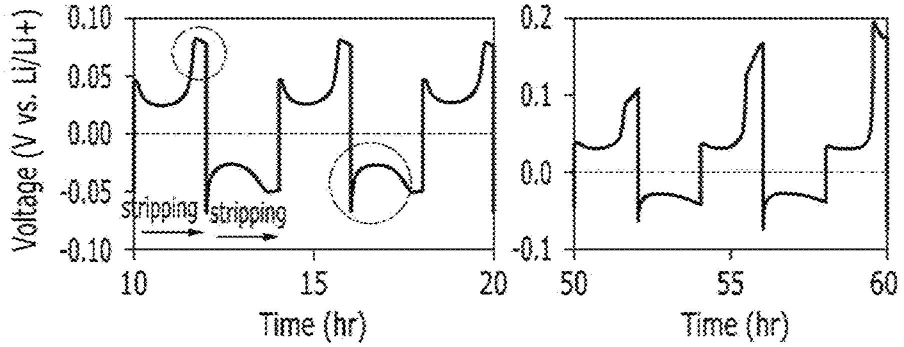

【Fig. 21】
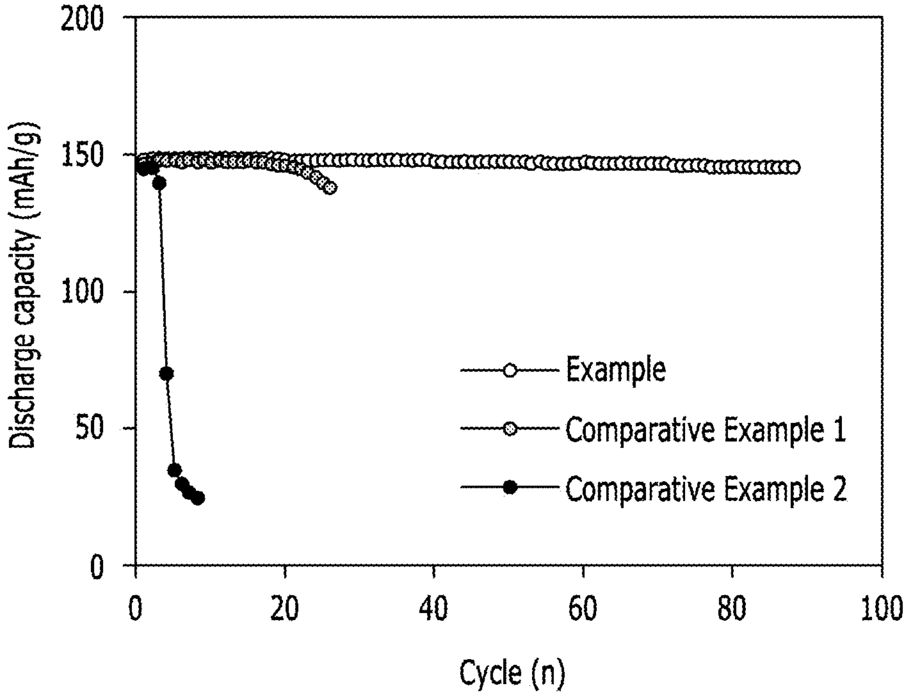

LITHIUM METAL ANODE, FABRICATION METHOD THEREOF, AND LITHIUM SECONDARY BATTERY COMPRISING SAME ANODE

CROSS REFERENCE OF RELATED APPLICATIONS

This application is Continuation Patent Application of U.S. patent application Ser. No. 16/473,087, filed Jun. 24, 2019, which is the U.S. National Phase under 35 U.S.C. § 371 of International Application No. PCT/KR2017/014870 filed on Dec. 15, 2017, which claims the benefit of Korean Application Nos. 10-2016-0178149 filed on Dec. 23, 2016 and 10-2017-0143551 filed on Oct. 31, 2017, the entire contents of each are hereby incorporated by reference.

TECHNICAL FIELD

The present invention is in related to a lithium metal anode, method for manufacturing the same, and lithium secondary battery including the same.

Background

Lithium metal has a high theoretical capacity of about 3,860 mAh/g and a density as low as 0.53 g/cm$^3$. Therefore, when lithium metal is used as the anode material of the secondary battery, the energy density of the battery can be greatly improved.

Graphite having a theoretical capacity of about 372 mAh/g is mainly used as an anode material of a commercially available lithium secondary battery. The energy density of a lithium secondary battery using such graphite as an anode material is about 150 to 250 Wh/kg.

However, in recent years, the use of lithium secondary batteries has expanded from portable electronic devices to electric power tools, automobiles, and the like, so that demand for lithium secondary batteries having high energy density is increasing.

In order to develop such a lithium secondary battery having high energy density, researches for applying lithium metal as an anode material of a lithium secondary battery are actively conducted.

However, when the lithium metal is used as an anode of a lithium secondary battery, the lithium metal anode includes a surface reaction layer which is difficult to control composition and characteristics due to the high reactivity of lithium. Accordingly, the surface reaction layer is a major cause of deteriorating reproducibility and characteristics of battery.

Therefore, it is urgent to develop a technique which improves the energy density, excellent charge/discharge characteristics, and reproducibility of the battery by applying a lithium metal anode.

Description

Technical Problem

These embodiments are intended to provide a lithium metal anode including a surface film (coating layer) whose composition and characteristics are controlled and a lithium secondary battery comprising the lithium metal anode.

The present embodiments provide a method of manufacturing a lithium metal anode capable of simultaneous manufacturing a lithium metal thin film layer and a coating layer on the surface of the lithium metal thin film layer in one process.

Technical Solution

A lithium metal anode according to an embodiment of the present invention includes a current collector; a lithium metal thin film layer disposed on at least one surface of the current collector and having a thickness in a range of 0.1 μm to 200 μm; and a coating layer disposed on a surface of the lithium metal thin film layer, wherein, the coating layer comprising a Li—N—C—H—O based ionic compound.

The coating layer can further comprises LiF.

The Li—N—C—H—O based ionic compound can include Li—O, C—N, C—O, and C—H bonds.

The Li—N—C—H—O based ionic compound is at least one of the compounds represented by formulas (1) and (2).

[Formula 1]

$$Li^{+}\,{}^{-}[O—R_1—R_2]_{n_1}A_1^{-}\,{}^{+}Li$$

(wherein in the formula 1, $R_1$ and, $R_2$ are each $CH_mF_{2-m}$ (m is one of 0, 1, or 2), $A_1$ is

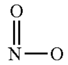 or 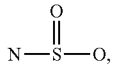

and n1 is an integer of 1 to 10)

[Formula 2]

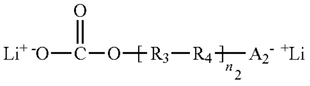

(wherein in the formula 2, $R_3$, and $R_4$ are each $CH_mF_{2-m}$ (m is one of 0, 1, or 2), $A_2$ is

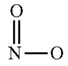 or 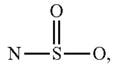

and n2 is an integer of 1 to 10.)

the compound represented by the formula (1) is at least one of the compounds represented by the following formulas (1-1) and (1-2), and the compound represented by the formula (2) is at least one of the compounds represented by the following formulas (2-1) and (2-2).

[Formula 1-1]

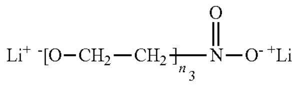

(wherein in the formula 1-1, n3 is an integer of 1 to 5.)

[Formula 1-2]

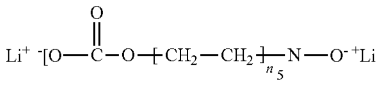

(wherein in the formula 1-2, $R_5$ and $R_6$ are each $CH_mF_{2-m}$ (m is one of 0, 1, or 2), and
n4 is an integer of 1 to 5.)

[Formula 2-2]

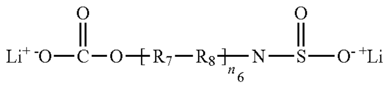

(wherein in the formula 2-1, n5 is and integer of 1 to 5.)

[Formula 2-2]

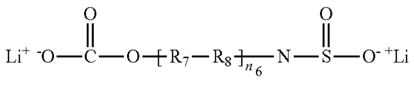

(wherein in the formula 2-2, $R_7$ and $R_8$ are each $CH_mF_{2-m}$ (m is one of 0, 1, and 2), and
n6 is an integer of 1 to 5.)

A thickness of the coating layer may be in a range of 2 nm to 2 μm, and a thickness of the coating layer may be in a range of 10 nm to 500 nm.

A lithium metal thin film layer has a flat surface microstructure without dendrite, and the lithium metal thin film layer includes a columnar structure extending upward from the current collector.

An average diameter of the columnar structure may be in the range of 0.1 μm to 100 μm.

An average pore fraction of the lithium metal thin film layer may be 10% or less.

A method for manufacturing a lithium metal anode according to an embodiment of the present invention includes the steps of: restraining a current collector and a lithium source in both directions and laminating them after electrically insulating the current collector and the lithium source in a plating solution; and forming simultaneously a metal thin film layer and a coating layer on at least one surface of the current collector by applying a current between the current collector and the lithium source; wherein the plating solution comprises a nitrogen-based compound.

The nitrogen-based compound may be at least one selected from the group consisting of lithium nitrate, lithium bis fluorosulfonyl imide, lithium bis trifluoromethane sulfonimide, e-Caprolactam, N-methyl-e-caprolactam, triethylamine, and tributylamine.

The plating solution includes the nitrogen-based compound in an amount of 1 wt % to 100 wt % based on 100 wt % of the plating solution.

The plating solution can further include a fluorine-based compound.

The fluorine compound may be at least one selected from the group consisting of Lithium difluoro phosphate, Lithium hexafluoro phosphate. Lithium difluoro bisoxalato phosphate. Lithium tetrafluoro oxalato phosphate. Lithium difluoro oxalate borate, Lithium difluoro oxalato borate, Lithium tetrafluoro oxalato borate, Fluoroethylene carbonate, Difluoroethylene carbonate, and 1,1,2,2-Tetrafluoroethyl 2,2,3,3-Tetrafluoropropyl ether.

The plating solution includes the fluorine compound in an amount of 0.1 wt % to 30 wt % based on 100 wt % by weight of the plating solution.

A lithium metal anode according to another embodiment of the present invention includes a current collector, a lithium metal thin film disposed on at least one surface of the current collector; and, a protective layer disposed on the surface of the lithium metal thin film.

A thickness of the lithium metal thin film is from 5 μm to 100 μm.

A thickness of the protective layer is from 10 nm to 100 nm.

The protective layer comprises at least one selected from the group consisting of F, P, C, O and S.

According to another embodiment of the present invention, there is provided a method of manufacturing a lithium metal anode, comprising: restraining a current collector and a lithium source in up and down direction and laminating them after electrically insulating the current collector and the lithium source in a electrolyte; and forming a lithium metal thin film on a surface of the current collector by applying a current to the current collector and the lithium source, wherein, a protective layer is formed on a surface of the lithium metal thin film at the step of forming a lithium metal thin film on a surface of the current collector, and the protective layer comprises at least one selected from the group consisting of F, P, C, O and S.

The step of forming simultaneously a metal thin film layer and a coating layer is carried out by applying a current between the current collector and the lithium source so that the average current density is in the range of 0.1 $mA/cm^2$ to 100 $mA/cm^2$ based on the current collector area.

A lithium secondary battery according to an embodiment of the present invention includes an anode, a cathode, and an electrolyte, and the anode may be a lithium metal anode according to the embodiment of the present invention.

Effect

The lithium metal anode according to the embodiments can provide a lithium metal anode having a homogeneous interface since a lithium metal thin film layer and a coating layer located on at least one side of the lithium metal thin film layer are simultaneously formed during the manufacturing process.

Further, according to the embodiments, it is possible to provide a lithium secondary battery in which electrochemical characteristics such as charge/discharge characteristics are remarkably improved by applying a lithium metal anode including a coating layer whose composition and characteristics are controlled on at least one surface of the lithium metal thin film layer.

BRIEF DESCRIPTION OF DRAWINGS

FIGS. 1 and 2 schematically illustrate a lithium metal anode according to one embodiment, respectively.

FIGS. 3 and 4 schematically show a manufacturing process of a lithium metal anode according to an embodiment.

FIG. 5 is a schematic view of a lithium secondary battery according to an embodiment.

FIGS. 6*a* and 6*b* are SEM photographs of the surface and cross-sectional microstructure of the lithium metal anode produced according to Example 1.

FIGS. 7*a* and 7*b* are SEM photographs of the surface and cross-sectional microstructure of the lithium metal anode produced according to Example 6.

FIGS. 8*a* and 8*b* are SEM photographs of the surface and cross-sectional microstructure of the lithium metal anode produced according to Comparative Example 1.

FIGS. 9*a* and 9*b* are SEM photographs of the surface and cross-sectional microstructure of the lithium metal anode produced according to Comparative Example 2.

FIGS. 10*a* and 10*b* are SEM photographs of the surface and cross-sectional microstructure of the lithium metal anode produced according to Comparative Example 3.

FIGS. 11*a* and 11*b* are SEM photographs of the surface and cross-sectional microstructure of the lithium metal anode produced according to Comparative Example 4.

FIGS. 12*a* to 12*d* show the results of surface component analysis of the lithium metal anode produced according to Example 1.

FIGS. 13*a* to 13*d* show the results of analyzing the surface components of the lithium metal anode produced according to Examples 2 to 4.

FIGS. 14*a* to 14*d* show the results of surface component analysis of the lithium metal anode prepared according to Comparative Examples 1 to 4.

FIG. 15*a* is a graph showing a charge/discharge performance evaluation result of a lithium secondary battery to which a lithium metal anode manufactured according to Examples 1 to 6 is applied.

FIG. 15B shows the results of analyzing the surface components of the lithium metal anode prepared according to Example 1 and Comparative Examples 1 to 4.

FIG. 16(*a*) shows the microstructure of a lithium metal anode produced according to Experimental Example 4 of the present invention, and FIG. 16(*b*) shows the microstructure of a lithium metal anode manufactured by a conventional electrodeposition method.

FIG. 17 shows the surface composition of the lithium metal anode produced according to Experimental Example 4 of the present invention, and FIG. 18 shows the surface composition of a lithium metal anode manufactured by a conventional method.

FIG. 19 shows the results of repetition of charging and discharging of a battery made of a lithium metal anode manufactured by the method of Experimental Example 4.

FIG. 20 shows the results of repetition of charging and discharging of a battery made of a lithium metal anode manufactured by a deposition method (PVD).

FIG. 21 shows charge-discharge characteristics and results of Experimental Example 4 and Comparative Examples 5 and 6.

DETAILED DESCRIPTION OF THE INVENTION

Hereinafter, embodiments of the present invention will be described in detail with reference to the accompanying drawings. The present invention may be embodied in many different forms and is not limited to the embodiments described herein.

In order to clearly illustrate the present invention, parts not related to the description are omitted, and the same or similar components are denoted by the same reference numerals throughout the specification.

In addition, since the sizes and thicknesses of the respective components shown in the drawings are arbitrarily shown for convenience of explanation, the present invention is not necessarily limited to those shown in the drawings.

Also, throughout the specification, when an element is referred to as "comprise" an element, it is understood that the element may include other elements as well, without departing from the other elements unless specifically stated otherwise.

Hereinafter, a lithium metal anode according to the present invention will be described in detail with reference to the drawings.

FIG. 1 schematically shows a lithium metal anode according to an embodiment.

In FIG. 1, a lithium metal anode 10 according to an embodiment includes a current collector 11, a lithium metal thin film layer 12, and a coating layer 13.

More specifically, in the lithium metal anode 10 according to the present embodiment, the lithium metal thin film layer 12 is positioned on both sides of the current collector 11, and the coating layer 13 is located on the surface of the lithium metal thin film layer 12.

The current collector 11 is for electrical connection in the cell.

The current collector 11 may have a shape of a foil but is not limited thereto. For example, the current collector 11 may be a mesh, a foam, a rod, a wire, or may be in the form of a sheet of woven wire or fiber.

As the material of the current collector 11, a material having electrical conductivity and having a limited reaction with lithium can be used. As the material of the current collector 11, for example, any one of a conductive material such as copper, nickel, titanium, stainless steel, gold, platinum, silver, tantalum, ruthenium and alloys thereof, carbon, conductive polymer, or a composite fiber coated with a conductive layer on a non-conductive polymer; or a combinations thereof may be used.

If the collector 11 is thick, the weight of the battery increases and the energy density of the battery decrease. If the thickness of the current collector 11 is reduced, there is a danger of overheat damage during high current operation and may be damaged by the tension during the battery manufacturing process. Therefore, the thickness of the current collector may range from 1 μm to 50 μm.

The lithium metal thin film layer 12 may be located on at least one surface of the current collector 11.

The lithium metal thin film layer 12 is characterized in that it has a smooth and dense surface microstructure without dendrite and includes a columnar structure extending upward from the current collector 11.

In the present invention, the columnar structure included in the lithium metal thin film layer 12 can be prepared by forming the lithium metal thin film layer 12 using an electrochemical plating method using a plating solution containing an appropriate component.

The average diameter of the columnar structure may be in the range of 0.1 μm to 100 μm, more specifically in the range of 5 μm to 40 μm.

When the average diameter of the columnar structure is not less than 0.1 μm, the surface uniformity of the lithium metal thin film layer 12 is excellent. Therefore, when the lithium metal anode according to the embodiment is applied to a battery, a lithium secondary battery has excellent electrochemical characteristics.

In addition, when the average diameter of the columnar structure is 100 μm or less, the time required for forming the lithium metal thin film layer 12 can be shortened, thereby improving the productivity.

This is because the average diameter of the columnar structure can be controlled by controlling the conditions of the electrodeposition process. For example, lowering the current density during the electrodeposition process increases the average diameter of the columnar structure, and increasing the current density decreases the average diameter of the columnar structure. That is, if the current density is lowered to increase the average diameter of the columnar structure, the time required for forming the lithium metal thin film layer 12 becomes long.

In the present specification, the average diameter of the columnar structure can be measured using the method of ASTM E 112 for the surface microstructure of the lithium metal anode 10.

On the other hand, the average pore fraction of the lithium metal thin film layer 12 may be 0.1% to 10%, more specifically 1% to 5%.

When the lithium metal thin film layer 12 has an average pore fraction of more than 10%, the lithium metal thin film layer 12 has a porous microstructure. In this case, when the lithium metal anode according to the embodiment is applied to a lithium secondary battery, desorption and adhesion of lithium are unevenly generated in the lithium metal anode 10 during charging and discharging to promote dendritic growth, and as dead lithium or the like, the battery capacity and charge/discharge life are deteriorated. In addition, when the lithium metal thin film layer 12 is manufactured with a low average pore fraction of 0.1% or less, the time required for forming the lithium metal thin film layer 12 according to the embodiment is increased, and productivity is reduced.

Next, the thickness of the lithium metal thin film layer 12 may be in the range of 0.1 μm to 200 μm, more specifically 0.1 μm to 30 μm.

When the thickness of the lithium metal thin film layer 12 is large, when the lithium metal anode according to the embodiment is applied to a lithium secondary battery, the weight of the battery increases and energy density becomes low. Further, since the production time and cost are increased in proportion to the thickness of the lithium metal thin film layer 12, the thickness of the lithium metal thin film layer 12 is preferably 200 μm or less.

When the thickness of the lithium metal thin film layer 12 is too thin, the charge/discharge life of the battery is deteriorated when the lithium metal anode according to the embodiment is applied to a lithium secondary battery. Specifically, during charging/discharging of the battery, lithium in the battery is gradually consumed due to side reaction between lithium contained in the active material and electrolyte, and the capacity of the battery is reduced. If the thickness of the lithium metal thin film layer 12 is thin, the amount of lithium that can replenish the lithium consumed during charging and discharging is reduced, so that the charge and discharge life of the battery is lowered. Therefore, the thickness of the lithium metal thin film layer 12 is preferably 0.1 μm or more The thickness of the lithium metal thin film layer 12 can be easily controlled by controlling electrodeposition process conditions such as current density and electrodeposition time in the step of forming the lithium metal thin film layer 12 using the electrochemical plating method.

Meanwhile, the lithium metal anode 10 according to the embodiment of the present invention includes a coating layer 13 positioned on the surface of the lithium metal thin film layer 12.

The coating layer 13 is formed by a reaction between the electrodeposited lithium metal and a plating solution in the process of manufacturing the lithium metal thin film layer 12. The thickness, composition and characteristics of the coating layer 13 can be controlled by adjusting the composition of the plating solution and the conditions of the electrodeposition process.

The thickness of the coating layer 13 may be in the range of, 2 nm to 2 μm, more specifically, 10 nm to 500 mu.

If the thickness of the coating layer 13 located on the surface of the lithium metal thin film layer 12 is too thick, the lithium ion conductivity may be lowered and the interfacial resistance may increase, so that the charge/discharge characteristics may be deteriorated when the that is applied to battery. If the thickness of the coating layer 13 is too small, the coating layer 13 may be easily lost in the process of applying the lithium metal anode according to the embodiment to the battery.

Therefore, it is preferable that the coating layer 13 is formed uniformly and densely on the entire surface of the lithium metal thin film layer 12 with a thin thickness within the range of the thickness.

On the other hand, the coating layer 13 contains a Li—N—C—H—O based ionic compound.

In the present embodiment, the coating layer 13 containing the Li—N—C—H—O based ionic compound is formed by controlling the composition and content of the plating solution during the process of manufacturing the lithium metal thin film layer 12 by an electroplating process.

The Li—N—C—H—O based ionic compound may include Li—O, C—N, C—O, and C—H bonds.

More specifically, the Li—N—C—H—O based ionic compound may include a compound represented by any one of the following formulas (1) and (2)

[Formula 1]

$$Li^{+}\,{}^{-}[O-R_1-R_2]_{n_1}A_1^{-}\,{}^{+}Li$$

(wherein in the formula 1. $R_1$ and, $R_2$ are each $CH_mF_{2-m}$ (m is one of 0, 1, or 2).

$A_1$ is

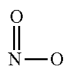 or 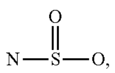, and n1 is an integer of 1 to 10)

[Formula 2]

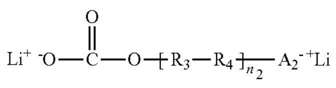

(wherein in the formula 2. $R_3$, and $R_4$ are each $CH_mF_{2-m}$ (m is one of 0, 1, or 2).

$A_2$ is

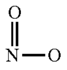 or 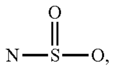, and n2 is an integer of 1 to 10.)

More specifically, the compound represented by Formula 1 may be at least one compound represented by Formula 1-1 or Formula 1-2.

The compound represented by Formula 2 may be at least one compound represented by Formula 2-1 or Formula 2-2.

[Formula 1-1]

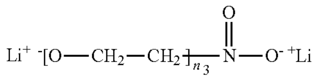

(wherein in the formula 1-1, n3 is an integer of 1 to 5.)

More specifically, for example, lithium nitrate ($LiNO_3$) is used as a nitrogen-based compound, and a plating solution in which an appropriate amount of the lithium nitrate is added to an ether solvent is used. In the case of forming the lithium metal thin film layer 12, the coating layer 13 containing the compound represented by the formula 1-1 may be formed on the surface of the lithium metal thin film layer 12.

[Formula 1-2]

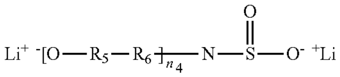

(wherein in the formula 1-2, $R_5$ and $R_6$ are each $CH_mF_{2-m}$ (m is one of 0, 1, or 2), and n4 is an integer of 1 to 5.)

More specifically, for example, by using a plating solution prepared by using lithium bisfluorosulfonyl imide ($LiN(FSO_2)_2$) as a nitrogen-based compound and adding it in an appropriate amount to an ether solvent. When the lithium metal thin film layer 12 is formed through the electrodeposition process, the coating film 13 containing the compound represented by the general formula 1-2 may be formed on the surface of the lithium metal thin film layer 12.

When lithium bisfluorosulfonylimide ($LiN(FSO_2)_2$) is used as the nitrogen-based compound contained in the plating solution, the Li—N—C—H—O based ionic compound may have a structure in which some of the C—H bonds of the —$CH_2$— structure is substituted with a C—F bond to form —$CH_mF_{2-m}$ (m is one of 0, 1, and 2).

[Formula 2-1]

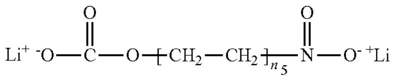

(wherein in the formula 2-1, n5 is and integer of 1 to 5.)

More specifically, for example, when the lithium metal thin film layer 12 is formed through electrodeposition using a plating solution in which lithium nitrate is used as a nitrogen-based compound and is added in a proper amount to a carbonate-based solvent. The coating layer 13 containing the compound represented by the general formula 2-1 may be formed on the surface of the lithium metal thin film layer 12.

[Formula 2-2]

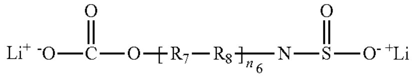

(wherein in the formula 2-2, $R_7$ and $R_8$ are each $CH_mF_{2-m}$ (m is one of 0, 1, and 2), and n6 is an integer of 1 to 5.)

More specifically, for example, a lithium metal thin film layer 12 is formed through an electrodeposition process using a plating solution obtained by using lithium bisfluorosulfonylimide as a nitrogen-based compound and adding the lithium bisfluorosulfonylimide to a carbonate-based solvent in an appropriate amount. The coating layer 13 containing the compound represented by the general formula 2-2 can be formed on the surface of the lithium metal thin film layer 12.

When lithium bisfluorosulfonylimide ($LiN(FSO_2)_2$) is used as the nitrogen-based compound contained in the plating solution, the Li—N—C—H-based ionic compound may have a structure in which a part of the C—H bonds of the —$CH_2$— may be substituted with a C—F bond to have a structure of —$CH_mF_{2-m}$— (m is one of 0, 1, and 2).

That is, in this embodiment, in the step of forming the lithium metal thin film layer 12, the nitrogen compound contained in the plating solution and the kind of the solvent and the content thereof are controlled, so that the coating layer 13 containing at least one compound selected from the compounds represented by the formulas I and 2 may be disposed on the surface of the lithium metal thin film layer 12.

On the other hand, the coating layer 13 may further include LiF in addition to a Li—N—C—H—O based ionic compound.

More specifically, for example, when lithium bisfluorosulfonylimide ($LiN(FSO_2)_2$) is used as the nitrogen-based compound contained in the plating solution, the coating layer 13 may further contain LiF in addition to the Li—N—C—H—O based ionic compound.

Also, when the plating solution further contains a fluorine-based compound such as fluoroethylene carbonate (FEC), the coating layer 13 may contain LiF together with a Li—N—C—H—O based ionic compound.

Thus, when the coating layer 13 further contains LiF, the electrochemical performance of the coating layer 13 can be further improved by interaction with a Li—N—C—H—O based ionic compound.

When the lithium metal anode 10 including the coating layer 13 containing a Li—N—C—H—O based ionic compound is applied to a lithium secondary battery as in the present embodiment, side reactions between the electrolyte and the lithium metal thin film layer 12 are blocked. In addition, it is possible to improve the charge/discharge life of the lithium secondary battery by suppressing the growth of dendrite by making the desorption and attachment of lithium uniform on the surface of the lithium metal thin film layer 12.

In addition, defects can be prevented from occurring in subsequent processes such as packaging, transportation, storage, and battery application of the lithium metal anode 10 of this embodiment. Since the lithium metal anode 10 according to the present embodiment includes the coating layer 13 positioned on the surface of the lithium metal thin film layer 12, the reaction of the lithium metal thin film layer 12 with water and/or oxygen can be blocked in the subsequent process, the reaction of the lithium metal thin film layer 12 with moisture and/It is possible to effectively prevent the formation of a non-uniform surface reaction layer on the surface of the lithium metal thin film layer 12. It is very effectively prevented that a non-uniform surface reaction layer (Native surface film) is formed on the surface of the lithium metal thin film layer 12.

FIG. 2 schematically shows a lithium metal anode for a secondary battery according to another embodiment.

Referring to FIG. 2, the lithium metal anode 10 according to the present embodiment includes a current collector 11, a lithium metal thin film layer 12 disposed on one surface of the current collector 11, and a coating layer 13 positioned on the lithium metal thin film layer 12.

The current collector 11, the lithium metal thin film layer 12, and the coating layer 13 of this embodiment are the same as those described in the embodiment with reference to FIG. 1. Therefore, detailed description of the same or similar components will be omitted.

Next, a method of manufacturing a lithium metal anode according to an embodiment of the present invention will be described.

A method of manufacturing a lithium metal anode according to an embodiment includes: restraining a current collector and a lithium source in both directions and laminating them after electrically insulating the current collector and the lithium source in a plating solution; and forming simultaneously a metal thin film layer and a coating layer on at least one surface of the current collector by applying a current between the current collector and the lithium source.

FIG. 3 schematically shows a manufacturing process of a lithium metal anode 10 for a secondary battery according to an embodiment of the present invention.

Referring to FIG. 3, a current collector 11 and a lithium source 20 to be laminated with a lithium metal thin film layer are supported in a plating solution 30.

The lithium source 20 can be, for example, a lithium metal, a lithium alloy, a foil obtained by pressing the lithium metal or lithium alloy on a current collector, or the like.

The current collector 11 is the same as that described above, and will not be described here.

The plating solution 30 may be prepared by dissolving a lithium salt in a non-aqueous solvent.

In this embodiment, the plating solution 30 is characterized in that it contains a nitrogen-based compound as at least one of the lithium salt and the non-aqueous solvent.

The nitrogen-based compound includes at least one selected from the group consisting of lithium nitrate, lithium bis fluorosulfonyl imide, lithium bis trifluoromethane sulfonimide, e-Caprolactam, N-methyl-e-caprolactam, triethylamine, and tributylamine.

At least one of lithium nitrate, lithium bis fluorosulfonyl imide and lithium bis trifluoromethane sulfonamide of the nitrogen-based compounds, can be used as a lithium salt.

At least one of e-Caprolactam, N-methyl-e-caprolactam, triethylamine and tributylamine of the nitrogen-based compounds can be used as a non-aqueous solvent.

The plating solution 30 may include the nitrogen-based compounds in an amount ranging from 1% by weight to 100% by weight, more specifically from 5% by weight to 90% by weight, more specifically from 5% by weight to 70% by weight, more specifically 5% by weight to 60% by weight based on 100 wt % of the plating solution.

When the content of the nitrogen-based compound is less than 1% by weight, there is a problem that the Li—N—C—H—O based ionic compound in the coating layer 13 is not formed properly.

Meanwhile, the plating solution 30 may be prepared using only the nitrogen-based compound, but a general non-aqueous solvent may be added as an auxiliary solvent in consideration of the viscosity of the plating solution. If the viscosity of the plating solution is too high, the mobility of lithium ions is lowered and the ion conductivity of the plating solution is lowered, so that the time required for forming the lithium metal thin film layer 12 is increased and productivity is reduced.

The auxiliary solvent may include, for example, at least one of ethylene carbonate, propylene carbonate, dimethyl carbonate, ethyl methyl carbonate, diethyl carbonate, 1,2-dimethoxyethane, diethylene glycol dimethyl ether, tetraethylene glycol dimethyl ether, tetrahydrofuran, 1,3-dioxolane, 1,4-dioxane or 1,3,5-trioxane.

The auxiliary solvent for controlling the viscosity of the plating solution may be included in an amount ranging from 5% by weight to 70% by weight, more specifically from 10% by weight to 60% by weight, based on 100% by weight of the plating solution.

Further, the plating solution 30 may further include a fluorine-based compound.

The fluorine-based compound, for example, includes at least one of Lithium difluoro phosphate, Lithium hexafluoro phosphate, Lithium difluoro bisoxalato phosphate, Lithium tetrafluoro oxalato phosphate, Lithium difluoro oxalate borate, Lithium difluoro oxalato borate, Lithium tetrafluoro oxalato borate, Fluoroethylene carbonate, Difluoroethylene carbonate, and 1,1,2,2-Tetrafluoroethyl 2,2,3,3-Tetrafluoropropyl ether.

The plating solution 30 may contain the fluorine-based compound in an amount ranging from 0.1% by weight to 30% by weight, more specifically from 1% by weight to 10% by weight, based on 100% by weight of the plating solution.

When the content of the fluorine-based compound is less than 0.1% by weight, the interaction between the nitrogen compound and the fluorine-based compound does not occur smoothly in the plating solution, and the effect of improving the properties of the coating layer 13 of the lithium metal anode 10 is not exhibited. When the content of the fluorine compound exceeds 30% by weight. LiF formation due to the direct reaction between the fluorine-based compound and lithium is excessively generated, and the electrochemical characteristics of the coating layer 13 is deteriorated.

Next, after the insulating film 40 is positioned between the current collector 11 and the lithium source 20, the current collector 11, the lithium source 20, and the insulating film 40 are laminated and restrained in both directions by using the restraint device 50.

At this time, the restraint device 50 can use a method generally used in the related art such as a manual clamping method, a uniaxial pressing method using a hydraulic pressure, a pneumatic pressure, or the like, and is not particularly limited.

The insulating film 40 may be a separator material used for a lithium secondary battery, and is not particularly limited.

After the electrodeposition equipment is constructed as described above, a current is applied to the current collector 11 and the lithium source 20 using the power supply 60 to form the coating layer 13 and the lithium metal thin film layer 12 on the current collector 11. At this time, the current collector 11 is connected to the (−) electrode and the lithium source 20 is connected to the (+) electrode.

The step of forming the lithium metal thin film layer and the coating layer on at least one surface of the current collector 11 is performed by applying a current between the current collector 11 and the lithium source 20.

The applied current may range from an average current density of 0.1 $mA/cm^2$ to 100 $mA/cm^2$, more specifically, 0.5 $mA/cm^2$ to 20 $mA/cm^2$, based on the collector surface area. When the current density is increased, the deposition rate of the lithium metal thin film layer is increased, so that the productivity is increased. However, the characteristics of the coating layer are deteriorated and then the performance of the produced lithium metal anode is lowered. Therefore, the current density is preferably in the above range.

Lithium moved from the lithium source 20 through the application of the electric current is electrodeposited on the surface of the current collector 11 to form the lithium metal thin film layer 12. At this time, the thickness of the lithium metal thin film can be easily controlled by controlling current density, electrodeposition time, and electrodeposition process conditions.

The coating layer 13 can be formed by a reduction decomposition reaction of the plating solution 30 on the surface of the current collector 11 and a reaction between the electrodeposited lithium metal thin film layer and the plating solution 30. The thickness, composition, and characteristics of the coated layer can be controlled by adjusting the composition of the plating solution 30 and the electrodeposition process conditions.

That is, the method for manufacturing a lithium metal anode according to the embodiments is characterized in that a metallic thin film layer and a coating layer are simultaneously formed using an electroplating process which is an electrochemical plating method.

More specifically, the electrodeposition process is performed in condition of normal temperature and atmospheric pressure (for example, 25° C. 1 atm), so that lithium ions are supplied from a lithium source, and lithium thin film layer 12 is laminated on the current collector 11 by electrochemically method.

When the electrochemical plating method is used, the lithium metal anode can be economically produced, the large area stacking can be easily achieved, and the thickness of the lithium metal thin film layer can be easily controlled. In addition, it is possible to control so that the coating layer having a specific component as described above is uniformly and densely formed on the surface of the lithium metal thin film layer during the manufacturing process. Therefore, when a lithium metal anode manufactured by the method according to this embodiment is applied to a lithium secondary battery, a lithium secondary battery having excellent electrochemical performance can be realized.

FIG. 3 shows a manufacturing process in which only one current collector 11 and one lithium source 20 are located, but a plurality of current collectors 11 may exist.

FIG. 4 schematically shows a process of manufacturing a lithium metal anode according to another embodiment.

Referring to FIG. 4, the current collector 11 may be positioned on both sides of the lithium source 20 with the insulating film 40 interposed therebetween, according to another embodiment of the process for producing a lithium metal anode. The current collector 11 and the lithium source 20 are connected to the power supply unit 60 to receive a current and a lithium metal thin film layer is formed on the surface of the current collector 11.

Likewise, by controlling the reduction decomposition reaction of the plating solution 30 on the surface of the current collector 11 and the reaction between the electrodeposited lithium metal thin film layer and the plating solution 30, a coating layer having a desired composition and characteristics is formed on the surface of the lithium metal thin film layer.

The lithium metal anode manufactured by the method according to the embodiments can be usefully used as a anode of a lithium secondary battery. That is, the lithium secondary battery according to one embodiment includes the cathode, the electrolyte, and the separator together with the lithium metal anode described above.

FIG. 5 schematically shows a structure of a lithium secondary battery according to an embodiment.

Referring to FIG. 5, the lithium secondary battery 100 includes an electrode assembly including a cathode 70, an anode 10, and a separator 90 disposed between the cathode 70 and the anode 10.

The electrode assembly is wound or folded and housed in the battery container 95.

Thereafter, the electrolyte 80 is injected into the battery container 95 and sealed to complete the lithium secondary battery 100. At this time, the battery container 95 may have a cylindrical shape, a square shape, a pouch shape, a coin shape, or the like.

The anode 10 uses the lithium metal anode 10 according to the above-described embodiments.

The cathode 70 may include a cathode active material layer and a cathode current collector.

The cathode active material layer can comprise lithium compound including at least one metal selected from Ni, Co, Mn, Al, Cr, Fe, Mg, Sr, V, La and Ce; and at least one non-metallic element selected from the group consisting of O, F, S, and P. The cathode active material layer may include active material particles having a size of about 0.01 to 200 μm, and may be appropriately selected depending on the required characteristics of the battery.

Optionally, a conductive material may be added to the cathode active material layer.

The conductive material may be, for example, carbon black and ultrafine graphite particles, fine carbon such as acetylene black, nano metal particle paste, and the like, but not limited thereto.

The cathode collector serves to support the cathode active material layer. As the cathode collector, for example, an aluminum foil, a nickel foil or a combination thereof may be used, but the present invention is not limited thereto.

As the electrolyte 80 to be filled in the lithium secondary battery 100, a non-aqueous electrolyte or a solid electrolyte may be used.

The non-aqueous liquid electrolyte may include, for example, a lithium salt such as lithium hexafluorophosphate and lithium perchlorate, and a solvent such as ethylene carbonate, propylene carbonate, and butylene carbonate. As the solid electrolyte, a gel polymer electrolyte obtained by impregnating a polymer electrolyte such as polyethylene oxide or polyacrylonitrile with an electrolytic solution, or an inorganic solid electrolyte such as LiI or $Li_3N$ can be used.

The separator 90 separates the cathode and the anode and provides a passage for lithium ions. Any separator 90 may be used as long as it is commonly used in a lithium secondary battery. That is, it is possible to use the separator having a low resistance to ion movement of an electrolyte and an excellent ability to impregnate an electrolyte. The separator may be selected from, for example, glass fiber, polyester, polyethylene, polypropylene, polytetrafluoroethylene, or a combination thereof, and may be in the form of a nonwoven fabric or a woven fabric. Meanwhile, when the solid electrolyte is used as the electrolyte 80, the solid electrolyte may also serve as the separator 90.

Next, a lithium metal anode for a secondary battery and a method of manufacturing the same according to another embodiment of the present invention will be described.

The lithium metal anode for a secondary battery according to another embodiment of the present invention may include a current collector, a lithium metal thin film positioned on at least one surface of the current collector, and a protective layer disposed on a surface of the lithium metal thin film.

First, the current collector is located at the center of the lithium metal anode. The current collector is for electrical connection within the cell. The current collector may have the form of a thin foil and may include Cu.

If the thickness of the current collector is increased, the weight of the battery is increased and the energy density of the battery is lowered. If the thickness of the current collector is reduced, there is a risk of overheating during high current operation and being damaged by the tension during the battery manufacturing process. In this embodiment, the thickness of the current collector may preferably be 6 to 100 μm.

The lithium metal thin film may be positioned on both sides of the current collector. As will be described later, the lithium metal thin film can be manufactured by an electroplating process. At this time, the thickness of the lithium metal thin film can be easily controlled by controlling current density, electrodeposition time, electrodeposition process conditions, and the like.

The thickness of the lithium metal thin film may be 5 μm to 100 μm.

A protective layer is placed on the surface of the lithium metal thin film. The protective layer is formed by the reaction between the electrodeposited lithium and the plating solution in the process of manufacturing the lithium metal thin film, and the composition of the plating solution and electrodeposition process conditions are controlled to control the thickness, composition, characteristics of the protective layer.

The thickness of the protective layer is preferably from 10 nm to 100 nm. If the thickness of the protective layer is too thick, the lithium ion conductivity is lowered and the high rate charge/discharge characteristics may be lowered when that is applied to the battery. If the thickness of the protective layer is too small, the characteristics are unstable and the protective layer may be lost during application of the battery. The protective layer is preferably thin and uniformly and densely formed over the entire lithium surface.

The protective layer improves the charge/discharge efficiency (coulombic efficiency) by lowering the polarization voltage when the secondary battery is applied, and can improve the charge/discharge life by suppressing the side reaction with the electrolyte.

The protective layer may comprise F, P, C, O, S, and the like. More specifically, the protective layer may comprise a material such as $CF_3$, $SO_2$, $ROCO_2Li$ (R=alkyl group), $Li_2CO_3$, LiF, and the like.

In this embodiment, the lithium metal thin film is positioned on both sides of the current collector and the protective layer may be located on the lithium metal thin film. Alternatively, the lithium metal anode for a secondary battery may include a lithium metal thin film and a protective layer only on one surface of the current collector.

Hereinafter, a method for manufacturing a lithium metal anode for a secondary battery according to another embodiment of the present invention will be described.

According to another embodiment of the present invention, there is provided a method of manufacturing a lithium metal anode, comprising:

restraining a current collector and a lithium source in up and down direction and laminating them after electrically insulating the current collector and the lithium source in a electrolyte; and forming a lithium metal thin film on a surface of the current collector by applying a current to the current collector and the lithium source, wherein, a protective layer is formed on a surface of the lithium metal thin film at the step of forming a lithium metal thin film on a surface of the current collector, and the protective layer comprises at least one selected from the group consisting of F, P, C, O and S.

Specifically, a current collector to which lithium is to be deposited and a lithium source are supported in an electrolyte for electrodeposition. The lithium source may be a lithium metal having a purity of 95 to 99.99%, a foil in which a lithium metal is laminated thinly on a current collector, lithium carbonate, lithium chloride, lithium nitride, or the like. As an electrolyte for electrodeposition, a conventional electrolytic solution in which a lithium salt such as $LiPF_6$, LiTFSI, or LiFSI used in a lithium ion battery is dissolved in a solvent can be used.

Next, after the insulating film is positioned between the current collector and the lithium source, a current collector, a lithium source and an insulating film are stacked and restrained in up and down direction by using a restraint device. The restraint device can use a method generally used in the related art such as a manual clamping method, a uniaxial pressing method using a hydraulic pressure, a pneumatic pressure, or the like, and is not particularly limited. The insulating film may be a separator material used for a lead acid battery, a nickel battery, a lithium ion battery or the like, and is not particularly limited. After the electrodeposition equipment is constructed, a current is applied to the current collector and the lithium source using a power supply. At this time, the current collector is connected to the (−) electrode and the lithium source is connected to the (+) electrode.

Through this voltage application, lithium moved from the lithium source is electrodeposited on the surface of the current collector to form a lithium metal thin film. At this time, the thickness of the lithium metal thin film can be easily controlled by controlling current density, electrodeposition time, electrodeposition process conditions, and the like. Further, a protective layer may be formed on the surface of the lithium metal thin film by a reaction between the lithium electrodeposited on the current collector and the electrodeposition solution. The thickness, composition, and characteristics of the protective layer can be controlled by adjusting the composition of the electrodeposition solution and the electrodeposition process conditions.

DETAILED EXAMPLE OF THE INVENTION

Hereinafter, the present invention will be described in more detail with reference to experimental examples. These experimental examples are only for illustrating the present invention, and the present invention is not limited thereto.

Example 1—Electrodeposition Process (Using a Plating Solution Containing a Nitrogen-Based and Fluorine-Based Compound)

A lithium metal anode was prepared by the same process as shown in FIG. 3.

The plating solution 30 is prepared by adding a lithium bis (fluorosulfonyl) imide and a lithium nitrate as a nitrogen based compounds to a 1,2-dimethoxyethane solvent, in amounts of 40% by weight and 10% by weight based on 100% by weight of the plating solution, respectively. Then 10% by weight of fluoroethylene carbonate, which is a fluorine based compound, was added based on 100% by weight of the plating solution.

As the lithium source 20, a lithium metal plate having a purity of 99.9% or more and having a thickness of 500 μm was pressed on a copper plate, and the current collector 11 was made of a copper foil having a thickness of about 15 μm.

The lithium source 20 and the current collector 11 are laminated in an electrically insulated state in the plating solution 30 and then the lithium source 20 and the current collector 11 are connected to each other through (+) and (−) electrode. Accordingly, a lithium metal thin film layer 12 was formed on the surface of the current collector 11. At this time, a lithium metal thin film layer 12 having a thickness of about 20 μm was prepared with an average current density of 0.7 $mA/cm^2$ and a process time of about hours. At this time, the reduction decomposition reaction of the plating solution 30 on the surface of the current collector 11 and the reaction between the electrodeposited lithium metal thin film layer 12 and the plating solution 30 are controlled to form a coating layer 13 on the surface of the lithium metal thin film layer 12.

Example 2—Electrodeposition Process (Change in Composition of Plating Solution)

A lithium metal anode was prepared in the same manner as an Example 1, except that lithium nitrate, which is a nitrogen compound, and fluoroethylene carbonate, which is a fluorine compound, were not added during the preparation of the plating solution.

Example 3—Electrodeposition Process (Change in Plating Solution Composition)

A lithium metal anode was prepared in the same manner as an Example 1, except that lithium nitrate, which is a nitrogen-based compound, was not added during the preparation of the plating solution and fluoroethylene carbonate as a fluorine compound was added in an amount of 10% by weight based on 100% by weight of the plating solution.

Example 4-Electrodeposition Process (Change in Composition of Plating Solution)

A lithium metal anode was prepared in the same manner as an Example 1, except that lithium nitrate, which is a nitrogen-based compound, was not added during the preparation of the plating solution and fluoroethylene carbonate as a fluorine compound was added in an amount of 20% by weight based on 100% by weight of the plating solution.

Example 5—Electrodeposition Process (Change in Composition of Plating Solution)

A lithium metal anode was prepared in the same manner as an Example 1, except that fluoroethylene carbonate, which is a fluorine compound, was not added during the preparation of the plating solution.

Example 6—Electrodeposition Process (Change in Composition of Plating Solution)

A lithium metal anode was prepared in the same manner as an Example 1, except that, lithium nitrate, which is a nitrogen compound, was added in an amount of 20% by weight based on 100% by weight of the plating solution, and lithium bis (fluorosulfonyl) imide as a nitrogen compound and fluoroethylene carbonate as a fluorine compound were not added.

Comparative Example 1—Electrodeposition Process (Using a Plating Solution Containing Only a Fluorine-Based Compound)

A lithium metal anode was prepared in the same manner as an Example 1, except that the plating solution was prepared as follows.

Lithium hexafluorophosphate ($LiPF_6$) was added to a solvent in which ethylene carbonate and ethyl methyl carbonate were mixed in a volume ratio of 3:7 in an amount of 30 wt % based on 100 wt % of the plating solution.

Comparative Example 2—Electrodeposition Process (Using a Plating Solution Containing No Nitrogen-Based and Fluorine-Based Compounds)

A lithium metal anode was prepared in the same manner as an Example 1, except that the plating solution was prepared as follows.

Lithium perchlorate ($LiClO_4$) was added to a solvent in which ethylene carbonate and ethyl methyl carbonate were mixed in a volume ratio of 3:7 in an amount of 20 wt % based on 100 wt % of the plating solution.

Comparative Example 3—Physical Vapor Deposition Process

In order to compare the microstructural characteristics and the electrochemical performance of the lithium metal anode manufactured by the conventional physical vapor deposition (PVD) method with the lithium metal anode produced according to the embodiments, a lithium metal thin film layer (Li—Cu foil) having a thickness of about 20 μm was prepared.

The lithium metal anode is prepared by a method of vacuum thermal evaporation. The method is that a lithium metal ingot having a purity of 99.9% or higher in a high vacuum chamber of $10^{-5}$ torr or less is heated to 700° C. or higher and laminated on the surface of a Cu foil.

Comparative Example 4—Rolling Process

In order to compare the microstructure characteristics and the electrochemical performance of the lithium metal anode prepared by the rolling method with the lithium metal anode prepared according to the embodiments, a lithium metal anode having a thickness of about 20 μm (Li—Cu foil) was prepared.

The lithium metal anode was prepared by rolling a lithium metal foil having a purity of 99.9% or more and a thickness of about 100 μm together with a copper foil in an inert gas atmosphere.

Experimental Example 1—Microstructure Analysis of Lithium Metal Anode

The surface and cross section of the lithium metal anode prepared according to Example 1. Example 6 and Comparative Examples 1 to 4 were measured at a magnification of ×2,000 using a scanning electron microscope.

FIGS. 6*a* and 6*b* are SEM photographs of the surface and cross-sectional microstructure of the lithium metal anode prepared according to Example 1. FIGS. 7*a* and 7*b* are SEM photographs showing the surface and cross-sectional micrographs of the lithium metal anode prepared according to Example 6.

FIGS. 8*a* and 8*b* are SEM photographs of the surface and cross-sectional microstructure of the lithium metal anode produced according to Comparative Example 1. FIGS. 9*a* and 9*b* are SEM photographs of the surface and cross-sectional microstructure of the lithium metal anode produced according to Comparative Example 2. FIGS. 10*a* and 10*b* are SEM photographs of the surface and cross-sectional microstructure of the lithium metal anode produced according to Comparative Example 3. FIGS. 11*a* and 11*b* are SEM photographs of the surface and cross-sectional microstructure of the lithium metal anode produced according to Comparative Example 4.

Referring to FIGS. 6*a* and 6*b*, a lithium metal anode manufactured using a plating solution containing both a nitrogen compound and a fluorine compound according to Example 1 has a smooth and dense surface microstructure without a dendrite. In addition, a cross section of the lithium metal thin film layer of the lithium metal anode manufactured according to Example 1 has a columnar structure extending upward from the current collector.

Next, referring to FIGS. 7*a* and 7*b*, it can be confirmed that the lithium metal anode manufactured using the plating solution containing only the nitrogen-based compound according to Example 6 has a smooth and dense surface microstructure without the dendrite. It can also be confirmed that the lithium metal thin film layer of the lithium metal anode produced according to Example 6 has a columnar structure stretched upward from the collector as an Example 1.

Referring to FIGS. 8*a* and 8*b*, a lithium metal anode manufactured using a plating solution containing only a fluorine-based compound according to Comparative Example 1 has a large number of dendrite protrusions and a non-uniform microstructure with high porosity.

Referring to FIGS. 9*a* and 9*b*, according to Comparative Example 2, a lithium metal anode made using a plating solution containing neither a fluorine-containing compound nor a nitrogen-based compound was formed in many dendrites and a non-uniform microstructure having a high porosity.

That is, referring to the surface and cross-sectional photographs of the lithium metal anode produced according to Comparative Examples 1 and 2, even when the electrodeposition process is used, when the plating solution does not contain a nitrogen compound as in the present invention, it can be seen that the columnar structure of the lithium metal thin film layer is not densely and uniformly grown and the resin dendrites are easily formed and the pores and surface roughness of the lithium metal thin film layer are increased.

On the other hand, referring to FIGS. 10*a* and 10*b* and FIGS. 11*a* and 11*b*, it can be seen that lithium metal anode of Comparative Examples 3 and 4 prepared by the physical vapor deposition method or the rolling method as in the prior art have a polycrystalline or microcrystalline structure of amorphous form.

That is, it is confirmed that the lithium metal anode according to the embodiments has a microstructural characteristic that the lithium metal thin film layer has a columnar structure, unlike the lithium metal anode (Li—Cu foil) manufactured by the existing commercialized method.

Experimental Example 2—Analysis of Mm Components of a Lithium Metal Anode

Surface components of the lithium metal anode prepared according to Examples 1 to 4 and Comparative Examples 1 to 4 were analyzed by the following method.

The analysis was carried out by using X-ray photoelectron spectroscopy (XPS). The lithium metal anode of each of Examples 1 to 4 and Comparative Examples 1 to 4 was subjected to surface analysis using peak intensity corresponding to Li 1s, C 1s, N 1s, and F 1s to analyze the constituents of the surface portion.

FIGS. 12*a* and 12*d* show the results of analyzing the surface components of the lithium metal anode prepared in Example 1, and FIGS. 13*a* and 13*d* show the results of analyzing the surface components of the lithium metal anode prepared in Examples 2 to 4. FIGS. 14*a* and 14*d* show the results of analyzing the surface components of the lithium metal anode prepared according to Comparative Examples 1 to 4.

Referring to FIGS. 12*a* and 12*d* and FIGS. 13*a* and 13*d*, on the surface of the lithium metal thin film layer of the lithium metal anode manufactured according to the examples 1 to 4, it can be confirmed that a coating layer containing a Li—N—C—H—O based ionic compound having all of Li—O, C—N, C—O and C—H bonds is formed by the nitrogenous compound contained in the plating solution. Further, it can be confirmed that the coating contains LiF by the fluorine-based compound contained in the plating solution.

In addition, no lithium was observed on the surface of the lithium metal anode, and it was confirmed that the coating layer prepared according to Examples 1 to 4 was uniformly formed on the surface of the lithium metal thin film layer.

In addition, lithium hydroxide (LiOH), lithium carbonate ($Li_2CO_3$), lithium oxide ($Li_2O$), and the like, which are components of a surface reaction layer (Native surface film) observed on a conventional lithium metal surface, were not observed at all. Thus, it can be seen that when the lithium metal anode is manufactured by the method of the present invention, the formation of the lithium metal thin film layer and the coating layer are simultaneously formed, and the generation of the nonuniform surface reaction layer can be effectively suppressed.

On the other hand, in Examples 2 to 4, the content of fluoroethylene carbonate as the fluorine compound was changed from 0% to 10% based on 100% by weight of the plating solution in the production of the plating solution. FIGS. 13*a* and 13*d*, it can be confirmed that as the content of the additive increases, the intensity of the peak corresponding to each component and bond changes. It can be seen that the composition and properties of the coating layer formed on the surface of the lithium metal thin film layer can be controlled by controlling the composition of the plating solution.

On the other hand, referring to FIGS. 14*a* and 14*d*, peaks corresponding to the C—N bond were not observed in the case of Comparative Example 1 and Comparative Example 2 in which the nitrogen compound was not contained in the plating solution, and this confirms that the coating layer formed on the surface of the lithium metal thin film layer does not contain a Li—N—C—H—O based ionic compound.

In addition, according to Comparative Example 3, no peak corresponding to the C—N bond was observed on the surface of the lithium metal anode produced by the conventional physical vapor deposition method and on the surface of the lithium metal thin film of the lithium metal anode produced by rolling according to Comparative Example 4. It can be confirmed that the Li—N—C—H—O based ionic compound is not present on the surface. Therefore, in the case of a lithium metal anode manufactured by a physical vapor deposition and rolling method, a surface reaction layer (Native surface film) composed of lithium hydroxide (LiOH), lithium carbonate ($Li_2CO_3$), lithium oxide ($Li_2O$) can be confirmed.

Since lithium hydroxide, lithium carbonate, lithium oxide, and the like, have very low lithium ion conductivity, so that the surface reaction layer composed of these components can prevent smooth movement of lithium ions during charging and discharging. Further, the surface reaction layer composed of the above components is fragile and has low applicability caused by volume change, so that it can be easily broken when a repeated volume change of the lithium metal anode during charging and discharging. Such breakage of the reaction layer may lead to abrupt and non-uniform reaction between the lithium metal and the electrolytic solution, resulting in deterioration of the charge-discharge performance of the battery.

Experimental Example 3—Evaluation of Charge/Discharge Performance of a Battery Using a Lithium Metal Anode A lithium secondary battery (2032 type coin full cell) having a structure as shown in FIG. 6 was manufactured using the lithium metal anode prepared according to Examples 1 to 6 and Comparative Examples 1 to 4, and the charging/discharging performance was evaluated respectively.

The cathode was prepared such that the cathode active material layer was laminated on one surface of the current collector (Al foil) using a cathode active material slurry containing $LiCoO_2$ (99 wt %) active material, a conductive material and a binder. At this time, the capacity per unit area of the cathode was made to be 3.1 mAh/$cm^2$, which is the cathode capacity level of the currently commercialized lithium secondary battery (using a graphite anode).

A mixed solvent of ethylene carbonate and ethyl methyl carbonate (3:7 by volume) in which 1 M of $LiPF_6$ was dissolved was used as an electrolyte solution.

The separator used was a model 2400 of Celgard, a polypropylene material, and a 2032 type coin cell of Hohsen Co., Ltd. was used as a battery container.

The charge/discharge performance of the lithium secondary battery manufactured by the above method was evaluated as follows.

The charging step was charged with a constant current up to 4.25V at 0.2C and then charged up to 4.25V to 0.05C. The discharging step was discharged at a constant current of 0.5C to 3.0V.

FIGS. 15*a* and 15*b* show the results of evaluating the charge/discharge performance of the lithium secondary battery manufactured by the above method by applying the lithium metal anode prepared according to Examples 1 to 6 and Comparative Examples 1 to 4.

FIG. 15*a* is a graph showing a charge/discharge performance evaluation result of a lithium secondary battery to which a lithium metal anode manufactured according to Examples 1 to 6 is applied. FIG. 15B shows the results of analyzing the surface components of the lithium metal anode prepared according to Example and Comparative Examples 1 to 4.

Table 1 also shows the results of evaluating the charge-discharge lifetime based on 80% of the initial discharge capacity.

TABLE 1

| division | Charge/discharge life (times) |
|---|---|
| Example 1 | 40 |
| Example 2 | 21 |
| Example 3 | 32 |
| Example 4 | 19 |
| Example 5 | 30 |
| Example 6 | 32 |
| Comparative Example 1 | 2 |
| Comparative Example 2 | 2 |
| Comparative Example 3 | 7 |
| Compare to 4 | 4 |

Referring to FIGS. 15*a* and 15*b* and Table 1, it can be seen that the lithium secondary battery to which the lithium metal anode manufactured according to Examples 1 to 6 is applied is remarkably superior compared to Comparative Examples 1 to 4.

Therefore, the results of Experimental Examples 1 to 3 indicate that the lithium metal anode manufactured by the method of the present invention contains a coating layer containing a Li—N—C—H—O based compound through control of plating solution composition and process conditions. Also, it can be confirmed that the lithium metal thin film layer is formed by uniformly stacking lithium through the coating layer to suppress the growth of dendrite and to have a dense microstructure.

Accordingly, when the lithium metal anode according to the embodiments is applied to a lithium secondary battery, it can be confirmed that the charge/discharge performance of the battery is improved.

Experimental Example 4

Lithium metal foil with a purity of 99% and a thickness of 200 μm was used as a lithium source, and a Cu foil with a thickness of 10 μm was used as a current collector, which is a base material on which lithium is electrodeposited. The electrolytic solution was prepared by dissolving LiFSI lithium salt in 1,2-dimethoxyethane at a concentration of IM and adding 5 wt % of fluoroethylene carbonate based on the lithium salt. As the insulating film, a cell guard 2400 used in a lithium ion battery was used to laminate a current collector, an insulating film, and a lithium source in this order, to carry it on the electrolytic solution to be charged, and press both sides to the restraint plate to apply pressure. Lithium was deposited on the surface of the current collector by applying a current to the current collector and the lithium source as the (−) and (+) electrodes, respectively, using a power supply unit. The current density was in the range of 0.1 to mA/cm$^2$. The electrodeposition time was 2 minutes to 120 hours to prepare a lithium metal thin film having a thickness of 5 μm to 50 μm.

FIG. 16(*a*) shows the microstructure of the lithium metal anode produced according to this Experimental Example. FIG. 6(*b*) shows the microstructure of a lithium metal anode produced by a conventional electrodeposition method.

Referring to FIG. 16(*a*), it can be seen that the lithium metal anode manufactured according to the present experimental example has a dense microstructure without a dendrite. However, in the case of a lithium metal anode manufactured by a conventional electrodeposition method (FIG. 16*b*), lithium was found to have a porous microstructure while growing in the form of a dendrite. That is, the lithium metal anode manufactured by the method of manufacturing a lithium metal anode according to this embodiment can have a dense fine structure without a dendrite on its surface.

FIG. 17 shows the surface composition of the lithium metal anode prepared according to Experimental Example 4. In addition, the surface composition of a lithium metal anode produced by a conventional method such as laminating or PVD is shown in FIG. 18. Referring to FIG. 18, in the case of a lithium metal anode manufactured by a conventional method, it is produced by a method of rolling or vapor deposition, and only oxygen and carbon components are present on the surface.

However, with reference to FIG. 17, in the case of a lithium metal electrode manufactured by the method according to an embodiment of the present invention, a components of F, P, S, and like, which originated from an in-situ generated surface protective layer during a lithium electrodeposition process.

Experimental Example 5: Evaluation of Electrochemical Characteristics

FIG. 19 shows the result of repeating the Li stripping/Li plating by preparing a lithium metal anode prepared by the method of Experimental Example 4 and a cell made of a combination of a Li foil and a coin cell. FIG. 20 shows a result of repeating charge and discharge by fabricating a coin cell in which a lithium metal anode and a Li foil were combined by a conventional PVD method. Comparing to FIGS. 19 and 20, it can be seen that the overvoltage of the lithium metal anode manufactured by the conventional PVD method takes a large from the beginning of the cell operation, and the overvoltage tends to increase significantly with the lapse of the cycle. However, it has been confirmed that the lithium metal anode manufactured by the method according to an embodiment of the present invention has a relatively low overvoltage and a stable cycle characteristic.

Experimental Example 6: Evaluation of Charge/Discharge Characteristics

A battery (coin full cell) was manufactured using the lithium metal anode manufactured by the method of Experimental Example 4 to evaluate charge-discharge characteristics. LCO materials were used for the cathode material and the charge and discharge characteristics of the lithium metal cathode manufactured by the rolling (Comparative Example 5) and the deposition (Comparative Example 6) processes were evaluated.

The charge-discharge characteristics and the results of Experimental Example 4 and Comparative Examples 5 and 6 are shown in FIG. 21. Referring to FIG. 21, it was confirmed that the lithium metal anode manufactured by the method of the present invention had excellent charge/discharge life characteristics as compared with the comparative example.

As described above, in the method of manufacturing a lithium metal anode according to an embodiment of the present invention, a lithium metal anode (Li—Cu foil) can be formed by applying an electroplating process which can use low-cost process equipment at normal temperature and pressure. It has excellent economical efficiency and commerciality compared with the conventional vacuum deposition process. In addition, the method of manufacturing a lithium metal anode according to an embodiment of the present invention can easily control the thickness of a lithium film to a range of several to several hundreds μm through a change in an electrodeposition process condition. Therefore, as the lithium thickness becomes thinner, problems of the conventional rolling process in which surface defects are increased can be solved.

The lithium metal anode manufactured in this manner can have a dense microstructure without a dendrite on its surface, and the protective layer is positioned to lower the polarization voltage, thereby improving the charge-discharge efficiency (coulombic efficiency) and suppressing the side reaction with the electrolyte. Accordingly, the charge and discharge life can be improved.

It will be understood by those skilled in the art that various changes in form and details may be made therein without departing from the spirit and scope of the present invention as defined by the following claims. It is therefore to be understood that the above-described embodiments are illustrative in all aspects and not restrictive.

DESCRIPTION OF SYMBOLS

10: Lithium metal anode
11: Current collector
12: Lithium metal thin film layer
13: Coating layer
20: Lithium source
30: plating solution
40: Insulating film
50: Restraint device
60: Power supply
70: Cathode
80: Electrolyte
90: Separate
95: Battery container
100: Lithium secondary battery

The invention claimed is:

1. A lithium metal anode comprising:

a current collector;

a lithium metal thin film layer disposed on at least one surface of the current collector; and a coating layer disposed on a surface of the lithium metal thin film layer, wherein the lithium metal thin film layer is disposed between the current collector and the coating layer, and the coating layer comprises a Li—N—C—H—O based ionic compound represented by formula (1) or formula (2), wherein the Li—N—C—H—O based ionic compound comprises Li—O, C—N, C—O, and C—H bonds, wherein the lithium metal thin film layer has a columnar microstructure extending from the current collector and a flat surface morphology free of dendrites, and the Li—N—C—H—O based ionic compound uniformly disposed across the flat surface of the lithium metal thin film layer:

[Formula 1]

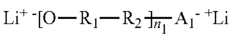

wherein in the formula 1, $R_1$ and, $R_2$ are each $CH_mF_{2-m}$, m is one of 1 or 2, $A_1$ is

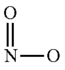 or 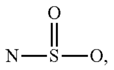

and n1 is an integer of 1 to 10,

[Formula 2]

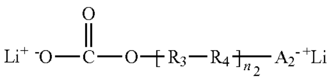

wherein in the formula 2, $R_3$, and $R_4$ are each $CH_mF_{2-m}$, m is one of 1 or 2, $A_2$ is

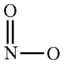 or 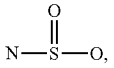

and n2 is an integer of 1 to 10.

2. The lithium metal anode of claim 1, wherein the coating layer further comprises LiF.

3. The lithium metal anode of claim 1, wherein the lithium metal thin film layer has a thickness in a range of 0.1 μm to 200 μm.

4. The lithium metal anode of claim 1, the compound represented by the formula (1) is at least one of the compounds represented by the following formulas (1-1) and (1-2), and the compound represented by the formula (2) is at least one of the compounds represented by the following formulas (2-1) and (2-2),

[Formula 1-1]

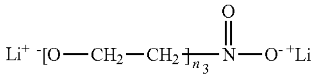

wherein in the formula 1-1, n3 is an integer of 1 to 5,

[Formula 1-2]

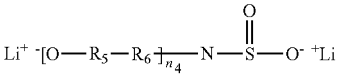

wherein in the formula 1-2, $R_5$ and $R_6$ are each $CH_mF_{2-m}$ (m is one of 1 or 2,), and n4 is an integer of 1 to 5,

[Formula 2-1]

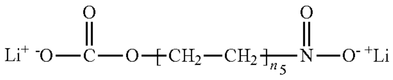

wherein in the formula 2-1, n5 is an integer of 1 to 5,

[Formula 2-2]

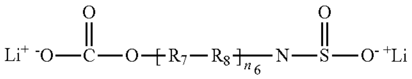

wherein in the formula 2-2, $R_7$ and $R_8$ are each $CH_mF_{2-m}$ (m is one of 1 and 2), and n6 is an integer of 1 to 5.

5. The lithium metal anode of claim 1, wherein a thickness of the coating layer is in a range of 2 nm to 2 μm.

6. The lithium metal anode of claim 1, wherein a thickness of the coating layer is in a range of 10 nm to 500 nm.

7. The lithium metal anode of claim 1, wherein an average diameter of the columnar microstructure is in the range of 0.1 μm to 100 μm.

8. The lithium metal anode of claim 1, wherein an average pore fraction of the lithium metal thin film layer is 10% or less.

9. A lithium secondary battery comprising:

an anode;

a cathode; and electrolyte, the anode is the lithium metal anode according to claim 1.

* * * * *